(12) United States Patent
Katoh et al.

(10) Patent No.: US 7,926,194 B2
(45) Date of Patent: Apr. 19, 2011

(54) INDICATOR, DETECTOR, AND DETECTION METHOD

(75) Inventors: Naotaka Katoh, Yamato (JP); Kaname Miyata, Yokohama (JP); Hideo Igami, Fujisawa (JP); Yuhta Ishii, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/666,775

(22) PCT Filed: Jun. 23, 2008

(86) PCT No.: PCT/JP2008/061406
§ 371 (c)(1),
(2), (4) Date: Dec. 24, 2009

(87) PCT Pub. No.: WO2009/004942
PCT Pub. Date: Jan. 8, 2009

(65) Prior Publication Data
US 2010/0180457 A1 Jul. 22, 2010

(30) Foreign Application Priority Data
Jun. 29, 2007 (JP) .................................. 2007-173165

(51) Int. Cl.
*G01C 9/06* (2006.01)
*G01C 9/10* (2006.01)
(52) U.S. Cl. ........................ 33/366.11; 33/365; 116/203
(58) Field of Classification Search ..................... 33/365, 33/366.11, 374, 375; 116/203
See application file for complete search history.

(56) References Cited

U.S. PATENT DOCUMENTS

| RE32,570 E | * | 1/1988 | Conn ............................... 33/365 |
| 5,669,147 A | * | 9/1997 | Nakajima et al. .......... 33/366.11 |
| 7,353,615 B1 | * | 4/2008 | Branch ...................... 33/366.11 |
| 2005/0248467 A1 | | 11/2005 | Igami et al. |
| 2007/0169360 A1 | * | 7/2007 | Kelley et al. ............... 33/366.11 |
| 2007/0214667 A1 | * | 9/2007 | Lin ............................. 33/366.11 |
| 2009/0293296 A1 | * | 12/2009 | Mukimura ...................... 33/365 |
| 2010/0000104 A1 | * | 1/2010 | Mollmer et al. ................ 33/365 |

FOREIGN PATENT DOCUMENTS

| JP | 2002-83530 A | 3/2002 |
| JP | 2004-340678 A | 12/2004 |
| WO | WO 2004/027806 A1 | 4/2004 |

OTHER PUBLICATIONS

International search report in parent patent application PCT/JP2008/061406, dated Jul. 22, 2008.

* cited by examiner

*Primary Examiner* — G. Bradley Bennett
(74) *Attorney, Agent, or Firm* — Steven Lieske Bennett

(57) ABSTRACT

To implement a detection technique in which a tumble of and a shock to on articles can be detected even with a simple and low-cost structure.
An indicator according to the present invention for detecting a tumble of and a shock to an article moves away from a holding guide in a detector when the detector inclines and goes beyond a limit for inclination. The indicator includes a first part in the shape of rolling on the holding guide when the detector inclines, and a second part smaller than the first part and in the shape of not preventing the first part from rolling. The first part and the second part join together and separate when receiving a shock.

20 Claims, 17 Drawing Sheets

SECTION A-A

FIG. 4
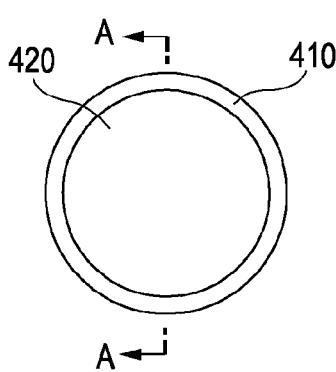 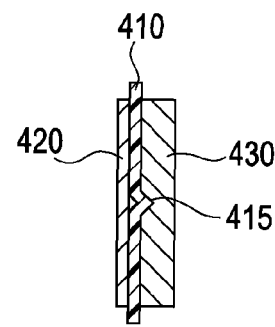
(a)
SECTION A-A
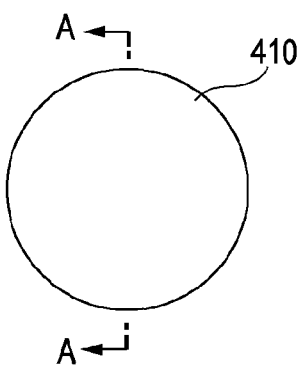 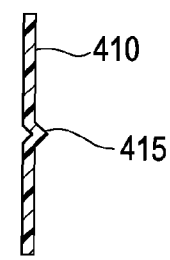
(b)
SECTION A-A
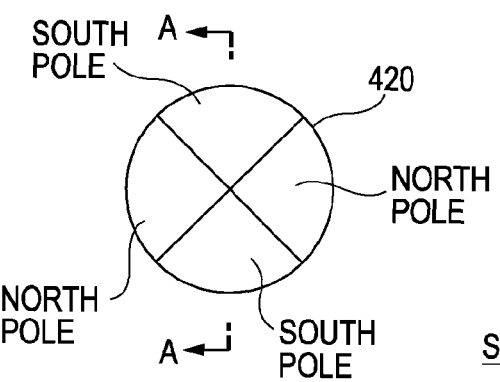 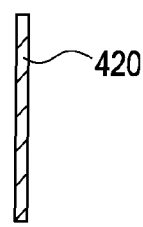
(c)
SECTION A-A
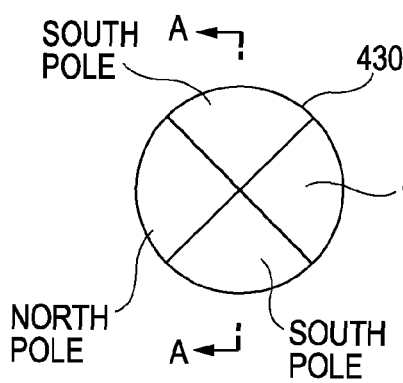 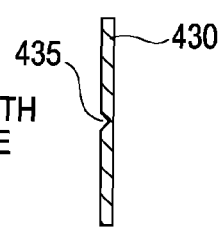
(d)
SECTION A-A

FIG. 6
600
(a) 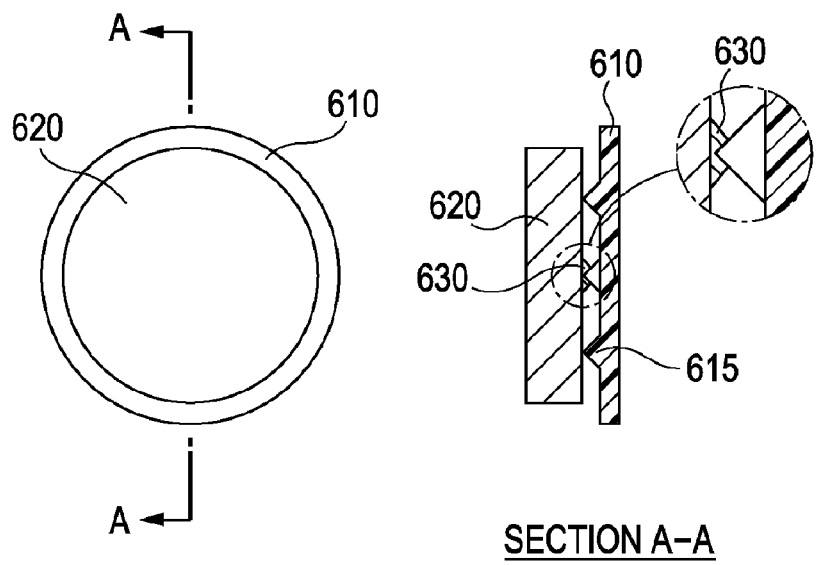
SECTION A-A
(b) 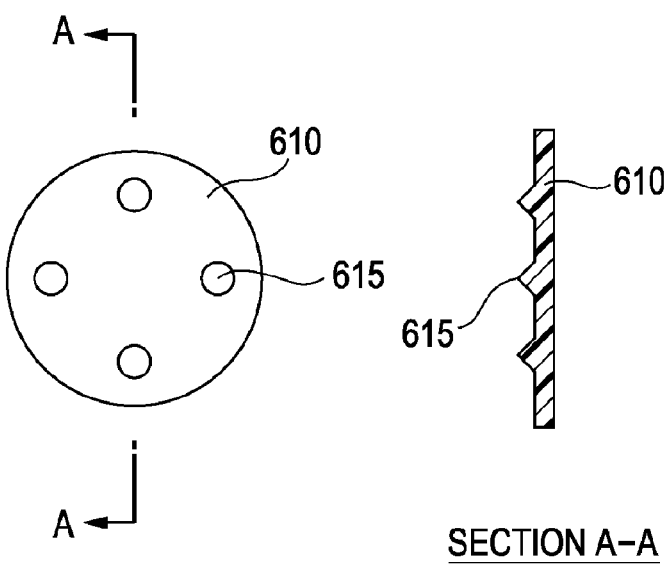
SECTION A-A

FIG. 7
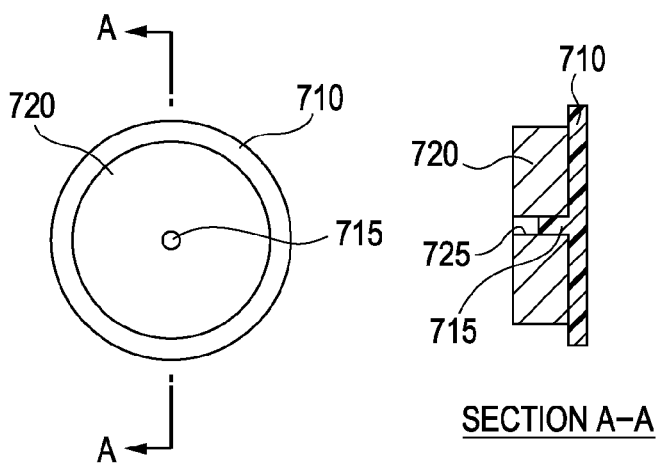
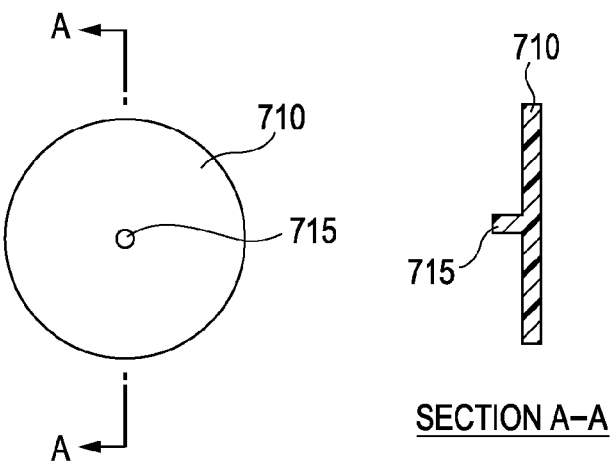
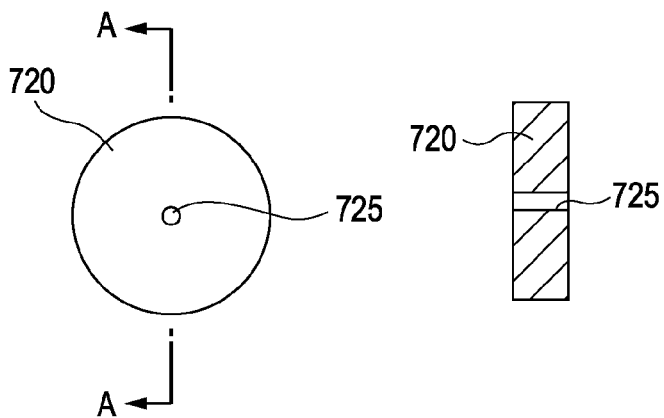

FIG. 9
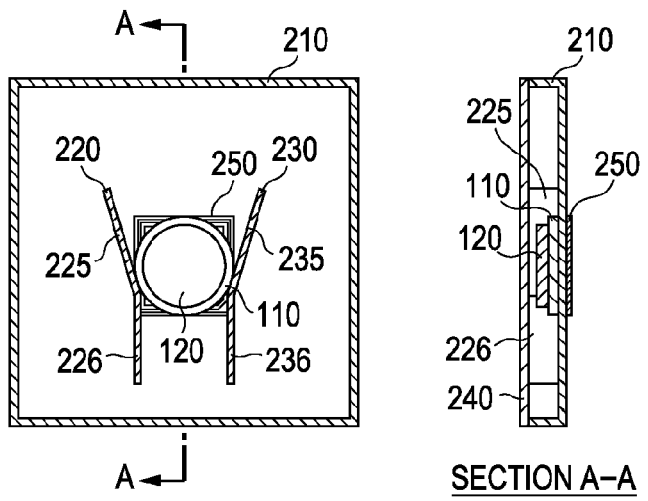
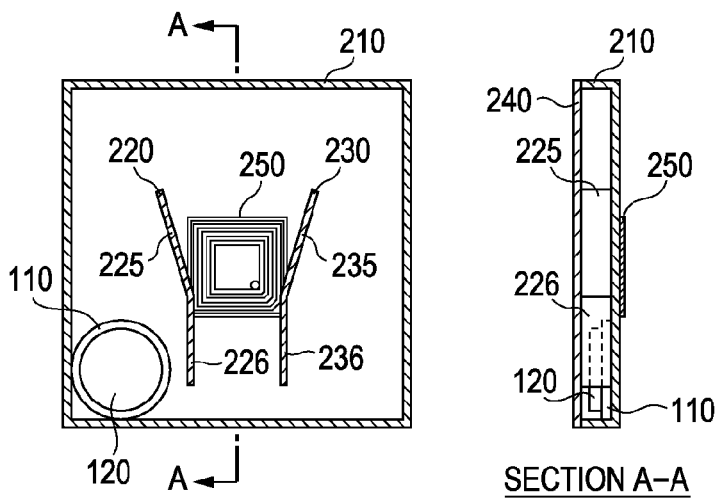
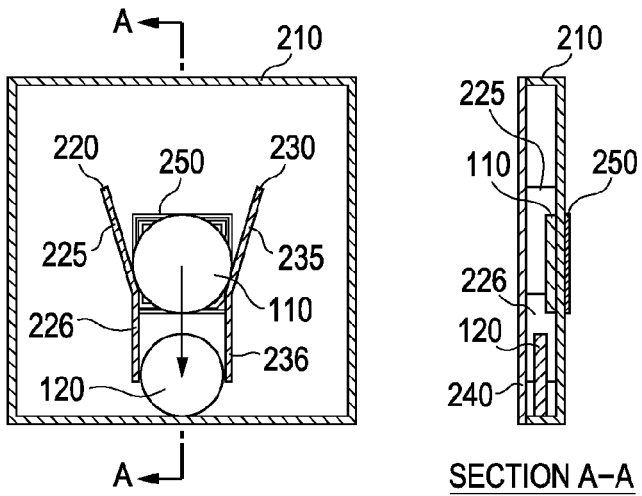

FIG. 10
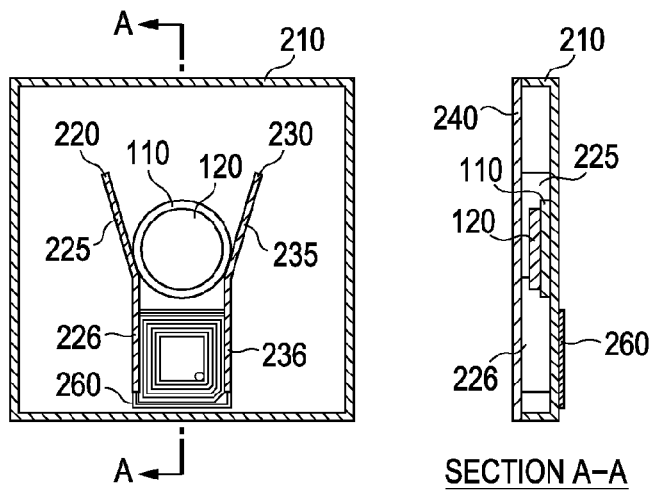
(a)
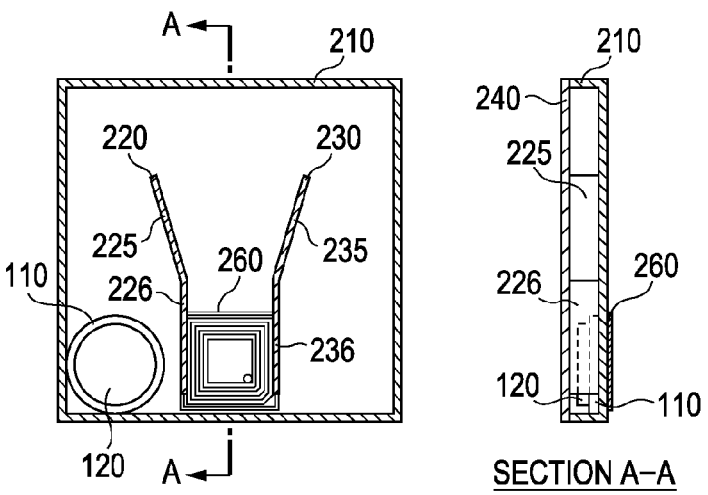
(b)
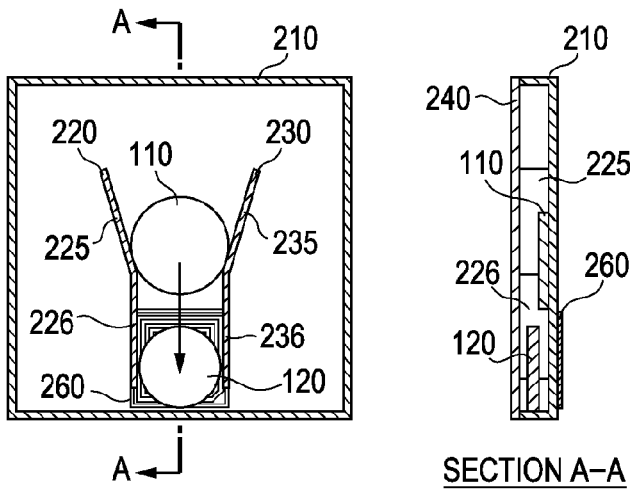
(c)

FIG. 11
1100
(a) 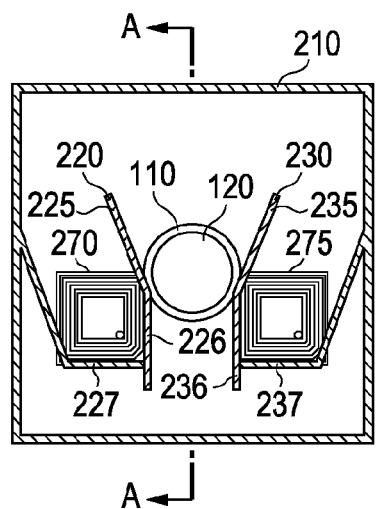 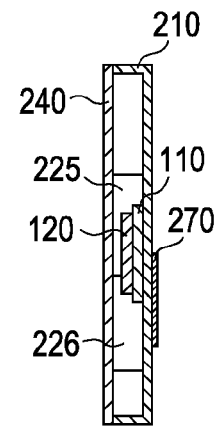
SECTION A-A
(b) 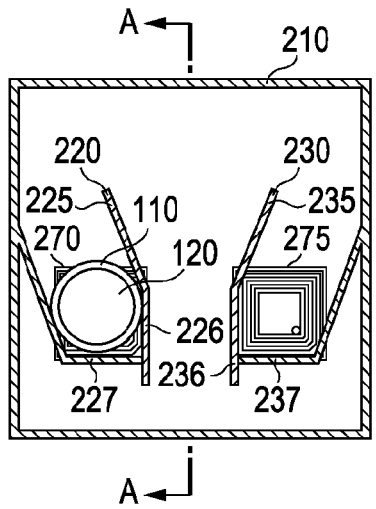 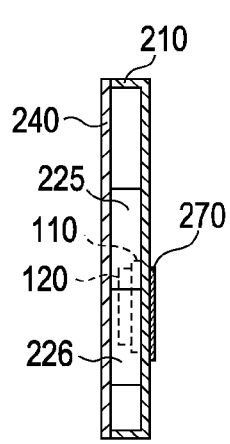
SECTION A-A
(c) 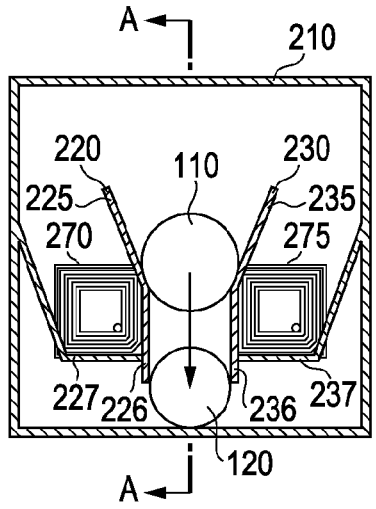 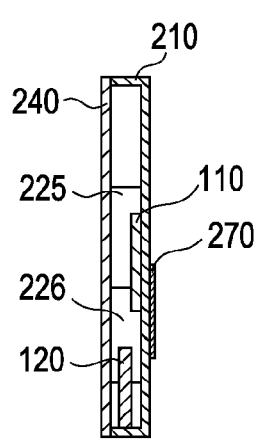
SECTION A-A FIG. 12
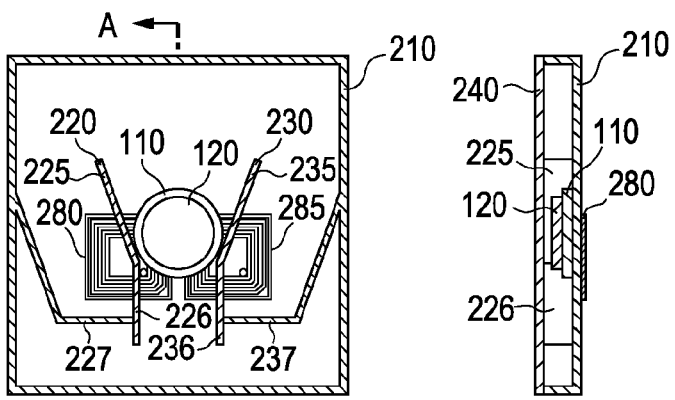
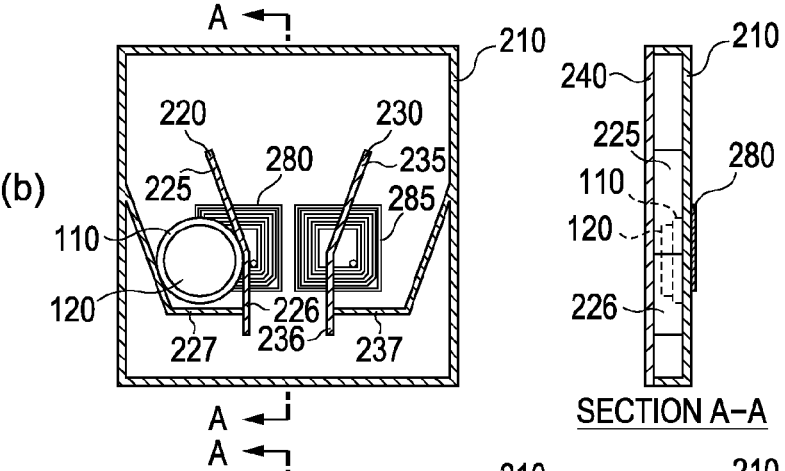
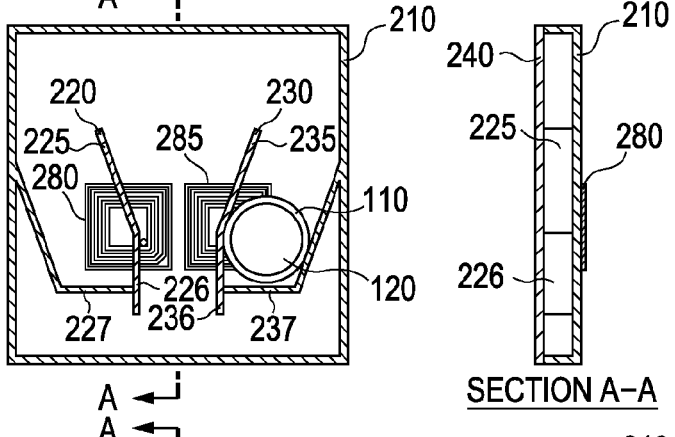
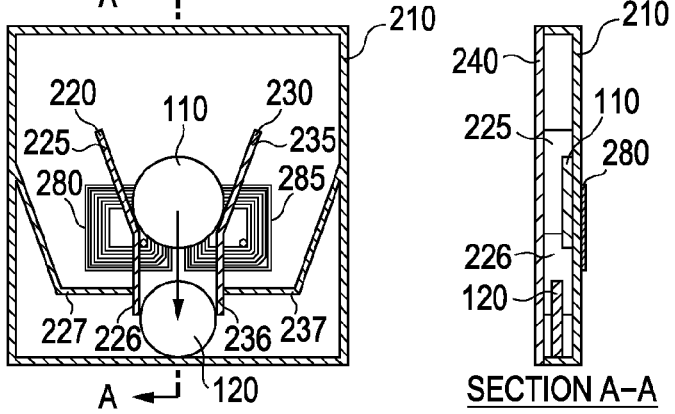

SECTION A-A

FIG. 18
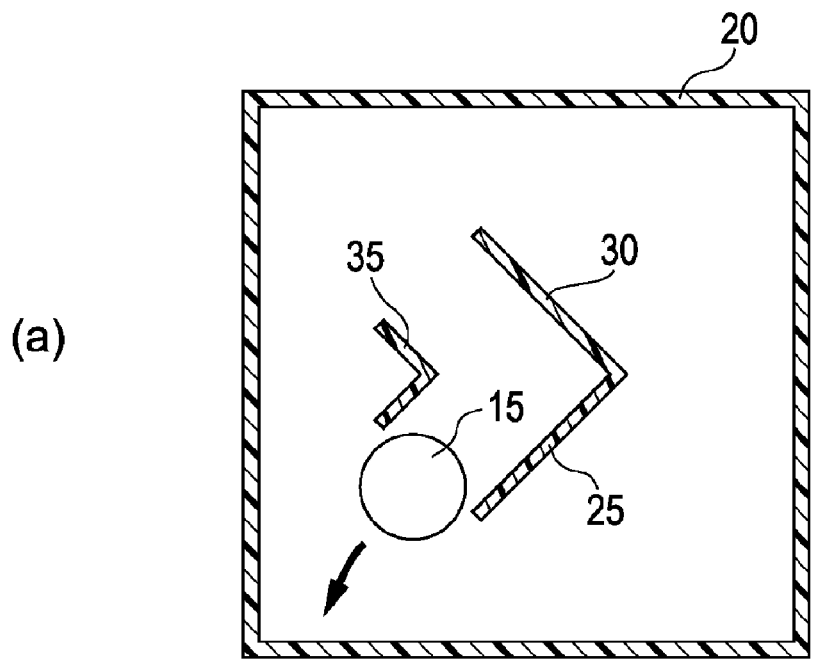
(a)
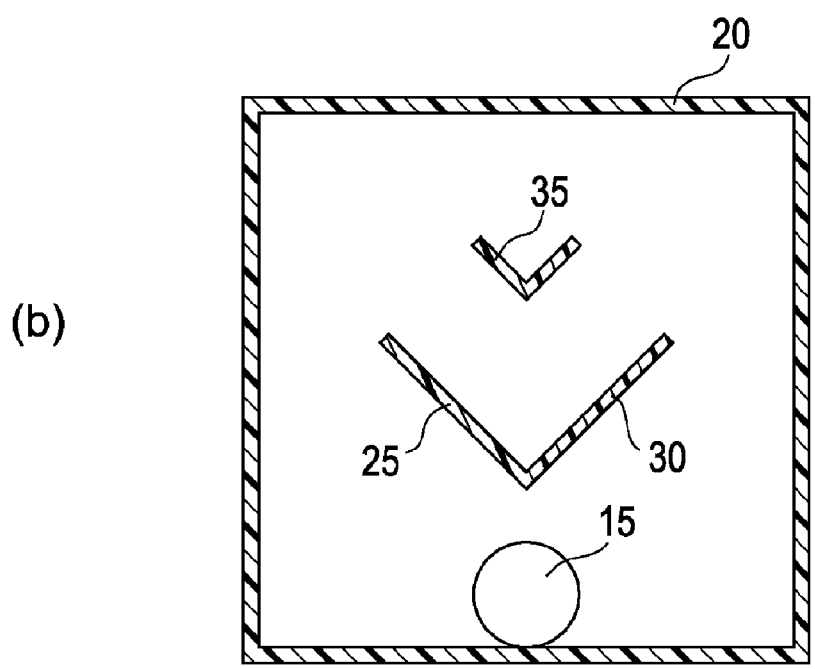
(b)

INDICATOR, DETECTOR, AND DETECTION METHOD

RELATED APPLICATIONS

The present patent application is a national stage patent application under 35 USC 371 and claims priority to the international (PCT) patent application filed on Jun. 23, 2008, and having the international (PCT) application number PCT/JP2008/061406, and to the Japanese patent application filed on Jun. 29, 2007, having the Japanese application number 2007-173165, and to which the international (PCT) patent application claims priority as well.

TECHNICAL FIELD

The present invention relates to techniques for detecting a tumble of and a shock to articles, and in particular, relates to an indicator for detecting a tumble of and a shock to articles, a detector for detecting a tumble of and a shock to articles by using the indicator, and a detection method for detecting a tumble of and a shock to articles by using the detector.

BACKGROUND ART

Hitherto, when articles susceptible to damage when the articles are tumbled over, for example, precision instruments such as video cameras or hard disks, are transported, a tumble detector that detects a tumble of an article has been attached to a container (an article) that holds many precision instruments so as to detect whether the article has been tumbled over during transportation. Tumble detectors of such a type include a tumble detector that incorporates an electrical circuit for recording and displaying the time when a tumble has occurred. Although a new function can be added to the tumble detector by incorporating the electrical circuit, the cost of the tumble detector increases. Tumble detectors in which it can be detected whether an article has been tumbled over during transportation and the cost is reduced include those described in U.S. Pat. Nos. 4,438,720 and RE32,570.

FIG. 16 shows a status in which a known tumble detector 10 is attached to a container 20 that holds many precision instruments. In FIG. 16, in view of a tumble of the container 20 in the forward-backward direction and the left-right direction, the tumble detector 10 is attached to each of the two adjacent sides of the container 20.

The known tumble detector 10 is similar in the basic principle to those described in U.S. Pat. Nos. 4,438,720 and RE32,570. The known tumble detector 10 includes a disk 15 that rolls (i.e., rotates) in response to the inclination, a pair of inclined guides 25 and 30 that retain the disk 15 in a case 20, an auxiliary guide 35 that assists the disk 15 to roll on the inclined guides 25 and 30, a cover 40 that covers the case 20, and an adhesive tape 45 for attaching the back face of the case 20 to an article, as conceptually shown in a front elevational view and Section A-A in FIG. 17. The disk 15 is composed of a single metal plate. The pair of inclined guides 25 and 30 and the auxiliary guide 35 are composed of synthetic resin such as plastic using a rib structure in which the pair of inclined guides 25 and 30 and the auxiliary guide 35 are formed integrally with the case 20.

When the container 20 is tumbled over, so that the tumble detector 10 inclines, for example, leftward to be tumbled over, the disk 15 rolls on and moves away from the inclined guide 25, as shown in Part (a) of FIG. 18. Even when the tumble detector 10 is returned to the original position by raising the tumbled over container 20 to a position shown in FIG. 16, the disk 15 remains at the bottom of the tumble detector 10 and is not returned to the initial position, shown in FIG. 17, where the disk 15 has been retained by the pair of inclined guides 25 and 30, as shown in Part (b) of FIG. 18.

In this way, after the container 20 is tumbled over, even when the container 20 is returned to the original position, the disk 15 remains at the bottom of the tumble detector 10 and is not returned to the initial position. Thus, it can be detected whether the container 20 has been tumbled over during transportation by checking the position of the disk 15 in the case 20 after the container 20 is transported.

Patent Document 1: U.S. Pat. No. 4,438,720
Patent Document 2: U.S. Pat. No. RE32,570

DISCLOSURE OF THE INVENTION

Problems to be Solved by the Invention

In known tumble detectors, as long as the tumble detectors have a simple structure based on the basic principle, it can be detected whether an article has been tumbled over during transportation with the cost being reduced to a low level. However, since known simple and low-cost tumble detectors have a simple structure, only it can be detected whether an article has been tumbled over during transportation, and it cannot be detected how much shock an article has received to during transportation due or not due to a tumble.

Moreover, in known simple and low-cost tumble detectors, it can be detected whether an article has been tumbled over during transportation. However, a problem exists in that it cannot be determined at all whether an article has been actually tumbled over with receiving a shock or has been merely laid horizontally without receiving a shock during transportation.

It is an object of the present invention to implement detection techniques in which the problems of the known art can be solved, in particular, a detection technique in which a tumble of and a shock to articles can be detected even with a simple and low-cost structure. The object of the present invention includes providing an indicator that enables detection of a tumble of and a shock to articles, a detector that can detect a tumble of and a shock to articles by using the indicator, and a detection method for detecting a tumble of and a shock to articles by using the detector.

Means for Solving the Problems

An indicator according to the present invention for detecting a tumble of and a shock to an article moves away from a holding guide in a detector when the detector inclines and goes beyond a limit for inclination. The indicator includes a first part in the shape of rolling on the holding guide when the detector inclines, and a second part smaller than the first part and in the shape of not preventing the first part from rolling. The first part and the second part join together and separate when receiving a shock.

In the indicator according to the present invention, it is preferable that the second part include two portions that join together by a magnetic force, the first part be sandwiched between the two portions and join to the second part, and the two portions separate from the first part when receiving a shock. Moreover, at least one of the two portions preferably includes a magnet.

It is preferable that the indicator according to the present invention further include a joining portion by which the first part and the second part are joined together, and the joining portion break upon receiving a shock, and separate the first part and the second part from each other. The joining portion preferably includes a linear member by which the first part and the second part are joined together at or near their respective barycenters. Alternatively, the joining portion preferably includes a bonding member by which the first part and the second part are joined together at their respective contact surfaces. Alternatively, yet, the joining portion preferably includes a supporting protrusion that protrudes from a surface of the first part and supports the second part.

In the indicator according to the present invention, the first part and the second part are preferably disk-shaped. Moreover, it is preferable that the first part transmit electromagnetic waves, and the second part shield electromagnetic waves.

A detector according to the present invention for detecting a tumble of and a shock to an article includes a case, an optically transparent cover to cover the case, a pair of guides which face each other and are set apart in the case, each having a slope portion sloping so as to be level when the detector inclines and reaches a limit for inclination, and an indicator held between the slope portions in the pair of guides, including a first part in the shape of rolling on the slope portion of the guide, and a second part smaller than the first part and in the shape of not preventing the first part from rolling, in which the first part and the second part join together and separate when receiving a shock.

In the detector according to the present invention, it is preferable that the pair of guides include pass portions to which the slope portions slopingly connect respectively, and the pass portions be set in the case with each of them separated at a distance of holding the first part but not holding the second part by both of the slope portions for the indicator. Moreover, capture portions, which catch the indicator moving away from the guides when the detector inclines beyond the limit for inclination, are preferably set in the case on both outsides of the pair of guides.

In the detector according to the present invention, it is preferable that the case, the cover, and the first part of the indicator transmit electromagnetic waves, the second part of the indicator shield electromagnetic waves, and a resonant tag, which is detuned by the second part of the indicator held between the slope portions in the pair of guides, be set on backside of the case (a detector 1 including a resonant tag). Alternatively, a resonant tag, which is detuned by the second part of the indicator stopped after passing between the pass portions in the pair of guides, is preferably set on backside of the case (a detector 2 including a resonant tag). Alternatively, a pair of resonant tags, which have different resonant frequencies and are detuned by the second part of the indicator caught in each of the capture portions, are preferably set on backside of the case (a detector 3 including resonant tags). Moreover, both of the pair of resonant tags may be detuned by the second part of the indicator held between the slope portions in the pair of guides (a detector 4 including resonant tags).

A method according to the present invention for detecting a tumble of and a shock to an article includes preparing a detector by using the aforementioned detector 1 including a resonant tag according to the present invention and fixing the detector to the article in the same manner, after moving the article, getting the article through a detection gate detecting resonance from the resonant tag, in a case where the detection gate has detected the resonance, determining that the article has inclined beyond the limit for inclination or received a shock, or both of them have happened to the article, and in a case where the detection gate has not detected the resonance, determining that the article has not inclined beyond the limit for inclination nor received a shock.

Another method according to the present invention for detecting a tumble of and a shock to an article includes preparing a detector by using the aforementioned detector 2 including a resonant tag according to the present invention and fixing the detector to the article in the same manner, after moving the article, getting the article through a detection gate detecting resonance from the resonant tag, and in a case where the detection gate has not detected the resonance, determining that the article has received a shock without inclining beyond the limit for inclination or inclined after receiving a shock even if it has inclined beyond the limit for inclination.

Yet another method according to the present invention for detecting a tumble of and a shock to an article includes preparing a detector by using the aforementioned detector 3 including resonant tags according to the present invention and fixing the detector to the article in the same manner, after moving the article, getting the article through two different detection gates detecting resonances from the pair of resonant tags respectively, in a case where both of the two detection gates have detected the resonances, determining that the article has not received a shock or has received a shock without inclining beyond the limit for inclination, or has inclined after receiving a shock even if it has inclined beyond the limit for inclination, and in a case where one of the two detection gates has not detected the resonance, determining that the article has inclined beyond the limit for inclination in a direction toward the resonant tag not having detected it.

Yet another method according to the present invention for detecting a tumble of and a shock to an article includes preparing a detector by using the aforementioned detector 4 including resonant tags according to the present invention and fixing the detector to the article in the same manner, after moving the article, getting the article through two different detection gates detecting resonances from the pair of resonant tags respectively, in a case where both of the two detection gates have detected the resonances, determining that the article has received a shock without inclining beyond the limit for inclination, or has inclined after receiving a shock even if it has inclined beyond the limit for inclination, and in a case where one of the two detection gates has not detected the resonance, determining that the article has inclined beyond the limit for inclination in a direction toward the resonant tag not having detected it.

ADVANTAGES

A detection technique in which a tumble of and a shock to articles can be detected even with a simple and low-cost structure is implemented via the present invention, so that the problems of the known art can be solved. Specifically, it can be determined whether an article has been actually tumbled over with receiving a shock or has been merely laid horizontally without receiving a shock during transportation.

BEST MODE FOR CARRYING OUT THE INVENTION

The best mode for carrying out the present invention will now be described in detail on the basis of the drawings. The following embodiments do not restrict the invention claimed in the claims. Moreover, all combinations of features described in the embodiments are not necessarily mandatory for the problem-solving means of the invention. The same numbers are assigned to the same components throughout the description of the embodiments. Moreover, the sizes of the individual components may be increased or decreased as necessary for purposes of illustration, and there is no intention in the sizes of the illustrated individual components and the relationships between the sizes of the components.

FIG. 1 shows the outline structure of an indicator 100 according to an embodiment of the present invention. The indicator 100 includes a shape that rolls on a guide when a detector inclines, for example, a first part 110 that is disk-shaped, and a shape that is smaller than the first part 110 and does not prevent the first part 110 from rolling, for example, a second part 120 that is disk-shaped, as shown in FIG. 1. Although the first part 110 and the second part 120 are joined together, the first part 110 and the second part 120 separate upon receiving a shock. The first part 110 may be composed of any material that can be formed into a shape such that the first part 110 rolls on a guide and is rigid. When the first part 110 is used so as to transmit electromagnetic waves, non-metallic material such as resin or ceramic is adopted. Similarly, the second part 120 may be composed of any material that is formable and rigid. When the second part 120 is used so as to shield electromagnetic waves, metallic material is adopted.

FIG. 2 shows the outline structure of a detector 200, in which the indicator 100 is used, according to an embodiment of the present invention. The detector 200 includes a case 210, an optically transparent cover (not shown in FIG. 2) that covers the case 210, a pair of guides 220 and 230 provided in the case 210 so that the guides 220 and 230 oppose each other and are separated from each other, and the indicator 100, in which the first part 110 and the second part 120 are joined together. The pair of guides 220 and 230 respectively include slope portions 225 and 235 each of which inclines so that the slope portion is laid horizontally when the detector 200 inclines until a limit for inclination, for example, an inclination of 70 degrees, is reached. The first part 110 and the second part 120 of the indicator 100 are set between the slope portions 225 and 235.

Parts (a) to (d) of FIG. 2 show how the indicator 100 is used, the indicator 100 being set in the detector 200. When the indicator 100 is set in the detector 200 or when the indicator 100 is stable, as shown in Part (a), the first part 110 and the second part 120 of the indicator 100 join together and stay between the slope portions 225 and 235 of the pair of guides 220 and 230. When the detector 200 inclines leftward to be tumbled over, as shown in Part (b), the first part 110 and the second part 120 of the indicator 100 roll and move away from the slope portion 225 of the guide 220 on the left side, the first part 110 and the second part 120 being joined together. Similarly, when the detector 200 inclines rightward to be tumbled over, as shown in Part (c), the first part 110 and the second part 120 of the indicator 100 roll and move away from the slope portion 235 of the guide 230 on the right side, the first part 110 and the second part 120 being joined together. When the first part 110 and the second part 120 of the indicator 100 have received a shock while the first part 110 and the second part 120 join together and stay between the slope portions 225 and 235, as shown in Part (a), the first part 110 and the second part 120 separate, as shown in Part (d). After the first part 110 and the second part 120 separate, the first part 110 stays between the slope portions 225 and 235. However, since the second part 120 is smaller than the first part 110, the second part 120 is not supported by the slope portions 225 and 235 and moves away from the slope portions 225 and 235. In this way, when the indicator 100 of the present invention is used in a detector, not only a tumble of an article but also a shock to the article can be detected visually through an optically transparent cover.

FIG. 3 shows a first example of the indicator 100. An indicator 300 includes a resin disk 310 corresponding to the first part 110 of the indicator 100 and a metal disk 320 and a magnet disk 330 that constitute two portions, corresponding to the second part 120 of the indicator 100, that are joined together by a magnetic force, as shown in FIG. 3. The resin disk 310 is sandwiched between and joined to the metal disk 320 and the magnet disk 330. However, the metal disk 320 and the magnet disk 330 can be separated from the resin disk 310 upon a shock by overcoming a binding force based on a magnetic force acting between the metal disk 320 and the magnet disk 330.

FIG. 4 shows a second example of the indicator 100. An indicator 400 includes a resin disk 410 corresponding to the first part 110 of the indicator 100 and a pair of magnet disks 420 and 430 that constitute two portions, corresponding to the second part 120 of the indicator 100, that are joined together by a magnetic force, as shown in Part (a) of FIG. 4. The resin disk 410 is sandwiched between and joined to the pair of magnet disks 420 and 430. However, similarly, the pair of magnet disks 420 and 430 can be separated from the resin disk 410 upon a shock by overcoming a binding force based on a magnetic force acting between the pair of magnet disks 420 and 430.

Parts (b), (c), and (d) of FIG. 4 show the resin disk 410 and the pair of magnet disks 420 and 430 together with their sections. The resin disk 410 shown in Part (b) includes a holding protrusion 415 near its center, i.e., at or near its barycenter. The magnet disk 430 shown in Part (d) includes a recess 435 corresponding to the holding protrusion 415. When the resin disk 410 and the magnet disk 430 are joined together, the holding protrusion 415 and the recess 435 are fitted together to prevent the resin disk 410 and the magnet disk 430 from shifting from each other due to, for example, vibrations. Moreover, since the pair of magnet disks 420 and 430 include a plurality of north poles and south poles, as shown in Parts (c) and (d), binding by a magnetic force acting between these poles is stable compared with binding by a magnetic force acting between single poles.

FIG. 5 shows a third example of the indicator 100. An indicator 500 includes a resin disk 510 corresponding to the first part 110 of the indicator 100 and a metal disk 520 corresponding to the second part 120 of the indicator 100, as shown in FIG. 5. The indicator 500 further includes a linear member 530, corresponding to a joining portion that joins the first part 110 and the second part 120 together and breaks upon a shock to separate the first part 110 and the second part 120 from each other, that joins the resin disk 510 and the metal disk 520 together at areas near their respective centers, i.e., at or near their respective barycenters, as a joining portion that joins the resin disk 510 and the metal disk 520 together. The linear member 530 is fixed to apertures respectively provided at or near the barycenters of the resin disk 510 and the metal disk 520, as shown in the section in FIG. 5. The linear member 530 may be composed of any material that breaks upon a shock. For example, when a graphite core is adopted as the linear member 530, the linear member 530 is sheared upon a shock to break, and the cost of the linear member 530 can be reduced to a low level.

FIG. 6 shows a fourth example of the indicator 100. An indicator 600 includes a resin disk 610 corresponding to the first part 110 of the indicator 100 and a metal disk 620 corresponding to the second part 120 of the indicator 100, as shown in Part (a) of FIG. 6. The indicator 600 further includes bonding members 630 that join the resin disk 610 and the metal disk 620 together at their respective contact surfaces as joining portions, as described above, that join the resin disk 610 and the metal disk 620 together.

The bonding members 630 are provided at junction protrusions 615 formed on a surface of the resin disk 610, as shown in the section in Part (a) of FIG. 6. Part (b) of FIG. 6 shows how the junction protrusions 615 are formed on the surface of the resin disk 610. Although the four junction protrusions 615 are shown, the number of the junction protrusions 615 is determined in a manner that depends on the necessity. The bonding members 630 are provided at all or some of the junction protrusions 615 in a manner that depends on the adhesive strength. The bonding members 630 may be composed of any material that breaks upon a shock. For example, a commercially available instant adhesive can be adopted as the bonding members 630. In this case, the bonding members 630 are peeled off upon a shock to break, and the cost of the bonding members 630 can be reduced to a low level. The metal disk 620 is thicker and heavier than the metals disks in the first to third examples. This is because the metal disk 620 needs to be reliably separated from the resin disk 610 upon a shock by overcoming a force, for binding the metal disk 620, based on the adhesive strength of the bonding members 630.

FIG. 7 shows a fifth example of the indicator 100. An indicator 700 includes a resin disk 710 corresponding to the first part 110 of the indicator 100 and a metal disk 720 corresponding to the second part 120 of the indicator 100, as shown in Part (a) of FIG. 7. The indicator 700 further includes a supporting protrusion 715 that protrudes from a surface of the resin disk 710 and supports the metal disk 720 as a joining portion, as described above, that joins the resin disk 710 and the metal disk 720 together.

The supporting protrusion 715 is formed near the center, i.e., at or near the barycenter, of the resin disk 710, as shown in Parts (a) and (b) of FIG. 7. Moreover, an aperture 725 corresponding to the supporting protrusion 715 is formed near the center, i.e., at or near the barycenter, of the metal disk 720, as shown in Parts (a) and (c) of FIG. 7. The supporting protrusion 715 is fitted into the aperture 725 to be fixed. Only one piece of the supporting protrusion 715 is formed on the resin disk 710. However, when the metal disk 720 is supported by pressing the metal disk 720 from the surrounding area, not by fitting the supporting protrusion 715 into the aperture 725 to be fixed, more than one piece of the supporting protrusion 715 are provided in positions for supporting the metal disk 720 from the surrounding area. The metal disk 720 is thicker and heavier than the metals disks in the first to third examples. This is because the metal disk 720 needs to be reliably separated from the resin disk 710 upon a shock by shearing the supporting protrusion 715.

FIG. 8 shows a first example of the detector 200 according to the present invention. A detector 800 includes the case 210, an optically transparent cover 240 that covers the case 210, the pair of guides 220 and 230 provided in the case 210 so that the guides 220 and 230 oppose each other and are separated from each other, and the indicator 100, in which the first part 110 and the second part 120 join together, as shown in FIG. 8. The pair of guides 220 and 230 include pass portions 226 and 236, respectively. The slope portions 225 and 235 of the guides 220 and 230 are connected to the pass portions 226 and 236 at angles, respectively. In the case 210, the pass portions 226 and 236 are provided at a distance, from each other, such that the slope portions 225 and 235 hold the first part 110 of the indicator 100 and do not hold the second part 120 of the indicator 100. Moreover, in the case 210, capture portions 227 and 237 that catch the indicator 100 moving away from the slope portions 225 and 235 when the detector inclines beyond a limit for inclination are provided outside the pair of guides 220 and 230. The indicator 100 moving away from the slope portions 225 and 235 can be reliably held in a predetermined place in the case 210 by providing the capture portions 227 and 237.

FIG. 9 shows a second example of the detector 200 according to the present invention. A detector 900 includes the case 210, the optically transparent cover 240, which covers the case 210, the pair of guides 220 and 230 provided in the case 210 so that the guides 220 and 230 oppose each other and are separated from each other, and the indicator 100, in which the first part 110 and the second part 120 join together, as shown in Part (a) of FIG. 9. The case 210, the cover 240, and the first part 110 of the indicator 100 transmit electromagnetic waves, and the second part 120 of the indicator 100 shields electromagnetic waves. The detector 900 further includes, on the back face of the case, a resonant tag 250 that does not resonate (i.e., is detuned) by the function of the second part 120 of the indicator 100 held by the pair of guides 220 and 230, in particular, the slope portions 225 and 235.

As long as the second part 120 of the indicator 100 is joined to the first part 110 and held between the slope portions 225 and 235, the resonant tag 250 is detuned because the resonant tag 250 is shielded from electromagnetic waves by the second part 120. However, when the detector 900 inclines beyond a limit for inclination, so that the first part 110 and the second part 120 of the indicator 100 move away from the slope portion 225 or 235 to move to the left or right side of the bottom of the case 210, the first part 110 and the second part 120 being joined together, as shown in Part (b) of FIG. 9, the resonant tag 250 can resonate because the resonant tag 250 is not shielded from electromagnetic waves by the second part 120. In a case where the first part 110 and the second part 120 of the indicator 100 separate when the detector 900 has received a shock, so that the first part 110 is still held between the slope portions 225 and 235 and the second part 120 is not held between the slope portions 225 and 235 and falls through the pass portions 226 and 236 to stop at the bottom of the case 210, as shown in Part (c) of FIG. 9, the resonant tag 250 can resonate because the resonant tag 250 is not shielded from electromagnetic waves by the second part 120 and the first part 110 transmits electromagnetic waves.

In this case, in an experiment, it was observed that the second part 120, which shields electromagnetic waves in the indicator 100, shields a resonant tag like the resonant tag 250 by at least 25%, so that the resonant tag 250 is detuned. Moreover, in the experiment, it was observed that when the resonant tag is shielded by about 25%, detuning of the resonant tag is affected by the angle which the plane of the resonant tag forms with the orientation of electromagnetic waves because the degree of shielding is small; when the angle falls within a range of up to 25 degrees from a right angle, the resonant tag is detuned; and when the resonant tag is shielded to a greater extent, detuning of the resonant tag is not affected by the angle.

FIG. 10 shows a third example of the detector 200 according to the present invention. A detector 1000 is constructed in the same manner as the detector 900 shown in FIG. 9, as shown in Part (a) of FIG. 10. However, the detector 1000 is different from the detector 900 in a place where a resonant tag is provided. A resonant tag 260 is provided at a portion of the back face of the case 210, the portion corresponding to the bottom of the case 210 between the pass portions 226 and 236 so that the resonant tag 260 is detuned by the second part 120 of the indicator 100, the second part 120 having passed between the pass portions 226 and 236 of the pair of guides 220 and 230 to stop.

Thus, as shown in Parts (a) and (b) of FIG. 10, when the second part 120 of the indicator 100 is joined to the first part 110 and held between the slope portions 225 and 235, or when the first part 110 and the second part 120 of the indicator 100 move away from the slope portion 225 or 235 to move to the left or right side of the bottom of the case 210, the first part 110 and the second part 120 being joined together, the resonant tag 260 can resonate because the resonant tag 260 is not shielded from electromagnetic waves by the second part 120. However, as shown in Part (c) of FIG. 10, when the second part 120 has received a shock while the second part 120 is joined to the first part 110 and held between the slope portions 225 and 235, the first part 110 and the second part 120 separate, so that the first part 110 is still held between the slope portions 225 and 235, and the second part 120 is not held between the slope portions 225 and 235 to fall through the pass portions 226 and 236 to stop. Then, the second part 120 shields electromagnetic waves to detune the resonant tag 260.

FIG. 11 shows a fourth example of the detector 200 according to the present invention. A detector 1100 is constructed in the same manner as the detector 900 shown in FIG. 9, as shown in Part (a) of FIG. 11. However, in this case, the capture portions 227 and 237 are added to the pair of guides 220 and 230, respectively, and one more resonant tag is added to provide a pair of resonant tags. Moreover, places where the pair of resonant tags are provided are different from the place where the resonant tag is provided in the detector 900. A pair of resonant tags 270 and 275 are provided at portions of the back face of the case 210, each of the portions corresponding to the second part 120, held in corresponding one of the capture portions 227 and 237, of the indicator 100, so that each of the pair of resonant tags 270 and 275 is detuned by the second part 120 held in corresponding one of the capture portions 227 and 237. Moreover, the pair of resonant tags 270 and 275 have different resonant frequencies.

Only when the first part 110 and the second part 120 of the indicator 100 move away from the slope portion 225 or 235, the first part 110 and the second part 120 being joined together, so that the first part 110 and the second part 120 are held in the capture portion 227 or 237, as shown in Part (b) of FIG. 11, corresponding one of the resonant tags 270 and 275 is detuned because the corresponding one of the resonant tags 270 and 275 is shielded from electromagnetic waves by the second part 120. Thus, when a resonant tag is detuned, so that the resonant frequency is not detected, the resonant tag having the resonant frequency, which is not detected, can be determined because the resonant tags 270 and 275 have different resonant frequencies, and it can be detected that the detector 1100 has inclined beyond a limit for inclination in the direction toward a place where the resonant tag is provided.

As shown in Parts (c) and (a) of FIG. 11, in a case where the second part 120 has received a shock while the second part 120 is joined to the first part 110 and held between the slope portions 225 and 235, and then the first part 110 and the second part 120 separate, so that the first part 110 is still held between the slope portions 225 and 235, and the second part 120 is not held between the slope portions 225 and 235 to fall through the pass portions 226 and 236, or in a case where the second part 120 of the indicator 100 is joined to the first part 110 and held between the slope portions 225 and 235, the resonant tags 270 and 275 are not detuned because the resonant tags 270 and 275 are shielded from electromagnetic waves by the second part 120. Thus, both of the resonant tags 270 and 275 resonate. Accordingly, when both of the resonant tags 270 and 275 resonate, it can be detected that the detector has not received a shock or has received a shock without inclining beyond the limit for inclination, or the detector has inclined after receiving a shock even if it has inclined beyond the limit for inclination.

FIG. 12 shows a fifth example of the detector 200 according to the present invention. A detector 1200 is constructed in the same manner as the detector 1100 shown in FIG. 11, as shown in Part (a) of FIG. 12. However, the detector 1200 is different from the detector 1100 in places where a pair of resonant tags are provided. A pair of resonant tags 280 and 285 are provided adjacent to each other at portions of the back face of the case 210, each of the portions covering a corresponding slope portion and a corresponding capture portion, so that not only is one of the resonant tags 280 and 285 detuned by the second part 120 of the indicator 100 held in corresponding one of the capture portions 227 and 237, but both of the resonant tags 280 and 285 are detuned by the second part 120 of the indicator 100 held between the slope portions 225 and 235. Moreover, similarly, the pair of resonant tags 280 and 285 have different resonant frequencies.

Only when the second part 120 of the indicator 100 is joined to the first part 110 and held between the slope portions 225 and 235, as shown in Part (a) of FIG. 12, both of the resonant tags 280 and 285 are detuned because the resonant tags 280 and 285 are shielded from electromagnetic waves by the second part 120. Thus, when either of the resonant frequencies is not detected, the second part 120 of the indicator 100 is joined to the first part 110 and held between the slope portions 225 and 235, i.e., it can be detected that the detector has not inclined beyond a limit for inclination and has not received a shock.

Only when the first part 110 and the second part 120 of the indicator 100 move away from the slope portion 225, the first part 110 and the second part 120 being joined together, so that the first part 110 and the second part 120 are held in the capture portion 227, as shown in Part (b) of FIG. 12, the resonant tag 280 is detuned because the resonant tag 280 is shielded from electromagnetic waves by the second part 120. Thus, when the resonant tag 280 is detuned, so that the resonant frequency is not detected, the resonant tag 280 having the resonant frequency, which is not detected, can be determined because the resonant tags 280 and 285 have different resonant frequencies, and it can be detected that the detector 1200 has inclined beyond the limit for inclination in the left direction toward a place where the resonant tag 280 is provided.

Similarly, only when the first part 110 and the second part 120 of the indicator 100 move away from the slope portion 235, the first part 110 and the second part 120 being joined together, so that the first part 110 and the second part 120 are held in the capture portion 237, as shown in Part (c) of FIG. 12, the resonant tag 285 is detuned because the resonant tag 285 is shielded from electromagnetic waves by the second part 120. Thus, when the resonant tag 285 is detuned, so that the resonant frequency is not detected, the resonant tag 285 having the resonant frequency, which is not detected, can be determined, and it can be detected that the detector 1200 has inclined beyond the limit for inclination in the right direction toward a place where the resonant tag 285 is provided.

When the second part 120 of the indicator 100 has received a shock while the second part 120 is joined to the first part 110 and held between the slope portions 225 and 235, and then the first part 110 and the second part 120 separate, so that the first part 110 is still held between the slope portions 225 and 235, and the second part 120 is not held between the slope portions 225 and 235 to fall through the pass portions 226 and 236, as shown in Part (d) of FIG. 12, the resonant tags 280 and 285 are not detuned because the resonant tags 280 and 285 are shielded from electromagnetic waves by the second part 120.

Thus, both of the resonant tags 280 and 285 resonate. Accordingly, when both of the resonant tags 280 and 285 resonate, it can be detected that the detector has received a shock without inclining beyond the limit for inclination, or has inclined after receiving a shock even if it has inclined beyond the limit for inclination.

The second part 120, which shields electromagnetic waves in the indicator 100, can detune resonant tags like the resonant tags 280 and 285 by shielding the resonant tags by at least 25%, as described above. Thus, one or both of the resonant tags 280 and 285 can be detuned, as described above, by disposing the resonant tags 280 and 285 as in the case of the detector 1200.

A tumble of and a shock to an article can be detected using the detector 800 shown in FIG. 8. The usage of the detector 800 will now be described. Using the detector 800, the detector is first set up by setting the indicator 100 in the pair of guides 220 and 230. Then, the detector 800 having been set up is attached to positions in an upper portion of an article 1300 in a manner such that the longitudinal direction of the detector 800 coincides with the height direction of the article 1300, as shown in FIG. 13. In view of a tumble of the article 1300 in two directions, i.e., the forward-backward direction and the left-right direction, the detector 800 is attached to two positions on adjacent sides of the article 1300. Then, after the article 1300 is moved by, for example, transportation, the first part 110 and the second part 120 of the indicator 100 in the detector 800 are visually observed through the cover 240.

A case where the first part 110 and the second part 120 have moved away from the guides 220 and 230, the first part 110 and the second part 120 being joined together, in the detector 800 attached to the two positions occurs when the article 1300 has inclined beyond the limit for inclination in a direction toward a place where the first part 110 and the second part 120 have moved away. Thus, in this case, it can be determined that the article 1300 has inclined beyond the limit for inclination in a direction toward a place where the first part 110 and the second part 120 have moved away, and such a determination is made. Moreover, a case where the first part 110 is held between the slope portions 225 and 235 and separated from the second part 120 in the detector 800 occurs when the article 1300 has not inclined beyond the limit for inclination but has received a shock. Thus, in this case, it can be determined that the article 1300 has not inclined beyond the limit for inclination but has received a shock, and such a determination is made. Moreover, a case where the first part 110 has moved away from the guides 220 and 230 and is separated from the second part 120 in the detector 800 occurs when the article 1300 has inclined beyond the limit for inclination in a direction toward a place where the first part 110 has moved away and has received a shock. Thus, in this case, it can be determined that the article 1300 has inclined beyond the limit for inclination in a direction toward a place where the first part 110 has moved away and has received a shock, and such a determination is made.

When the detector 900, in which the resonant tag 250 is provided, shown in FIG. 9 is used, a tumble of and a shock to an article can be detected using a detection gate that detects the resonant frequency of a resonant tag. A method for detecting a tumble of and a shock to an article using the detector 900 will now be described as an embodiment according to the present invention. Using the detector 900, the detector 900 is first prepared by setting the indicator 100 on the pair of guides 220 and 230. Then, in the same way as the aforementioned method, in which the detector 800 is used, the detector 900 having been prepared is fixed to an upper position of the article 1300 with the longitudinal direction of the detector 900 correspondent to the height direction of the article 1300. In view of a tumble of the article 1300 in two directions, i.e., the forward-backward direction and the left-right direction, the detector 900 is fixed to two positions on adjacent sides of the article 1300. Then, after the article 1300 is moved by, for example, transportation, the article 1300 is passed through a detection gate 1400 that detects resonance of a resonant tag, as shown in FIG. 14, to detect whether the resonant tag is resonating. The detection gate 1400 includes an electromagnetic wave transmitting antenna 1410 and an electromagnetic wave receiving antenna 1420.

When the detection gate 1400 has detected the resonant frequency of the resonant tag 250 in the detector 900, the second part 120, which shields electromagnetic waves, is not detuning the resonant tag 250, i.e., the second part 120 is not held between the slope portions 225 and 235 of the pair of guides 220 and 230. Such a case where the second part 120 is not held between the slope portions 225 and 235 occurs when the article 1300 has inclined beyond the limit for inclination or received a shock, or both of them have happened to the article 1300. Thus, in this case where the resonant frequency has been detected, it can be determined that the article 1300 has inclined beyond the limit for inclination or received a shock, or both of them have happened to the article 1300, and such a determination is made. This determination is made by an existing computer-controlled logistics monitoring system that is improved so as to carry out the detection method according to the present invention in response to a detection signal output when the detection gate 1400 has detected the resonant frequency.

In this case where the resonant frequency has been detected, it is preferable to further visually observe the first part 110 and the second part 120 of the indicator 100 in the detector 900 through the cover 240 to make a determination in the following way. When the first part 110 and the second part 120 have moved away from the guides 220 and 230, the first part 110 and the second part 120 being joined together, it can be determined that the article 1300 has inclined beyond the limit for inclination, and thus such a determination is made. Moreover, when the first part 110 is held between the slope portions 225 and 235 and separated from the second part 120, it can be determined that the article 1300 has not inclined beyond the limit for inclination but has received a shock, and thus such a determination is made. Moreover, when the first part 110 has moved away from the guides 220 and 230 and is separated from the second part 120, it can be determined that the article 1300 has inclined beyond the limit for inclination and received a shock, and thus such a determination is made.

On the other hand, when the detection gate 1400 has not detected the resonant frequency of the resonant tag 250, the second part 120, which shields electromagnetic waves, is detuning the resonant tag 250, i.e., the second part 120 is joined to the first part 110 and held between the slope portions 225 and 235 of the pair of guides 220 and 230. Such a case where the second part 120 is held between the slope portions 225 and 235 occurs when the article 1300 has not inclined beyond the limit for inclination nor received a shock. Thus, in this case where the resonant frequency has not been detected, it can be determined that the article 1300 has not inclined beyond the limit for inclination nor received a shock, and such a determination is made. This determination is also made by an existing computer-controlled logistics monitoring system that is improved so as to carry out the detection method according to the present invention in a case where the detection gate 1400 has not output a detection signal when having not detected the resonant frequency.

Moreover, when the detector 1000, in which the resonant tag 260 is provided, shown in FIG. 10 is used, a tumble of and a shock to an article can be detected using a detection gate. A method for detecting a tumble of and a shock to an article using the detector 1000 will now be described as another embodiment according to the present invention. Using the detector 1000, the detector 1000 is first prepared by setting the indicator 100 on the pair of guides 220 and 230. Then, in the same way as the aforementioned method, in which the detector 800 is used, the detector 1000 having been prepared is fixed to an upper position of the article 1300 with the longitudinal direction of the detector 1000 correspondent to the height direction of the article 1300. In view of a tumble of the article 1300 in two directions, i.e., the forward-backward direction and the left-right direction, the detector 1000 is fixed to two positions on adjacent sides of the article 1300. Then, after the article 1300 is moved by, for example, transportation, the article 1300 is passed through the detection gate 1400, which detects resonance of a resonant tag, in the same way to detect whether the resonant tag is resonating.

When the detection gate 1400 has not detected the resonant frequency of the resonant tag 260 in the detector 1000, the second part 120, which shields electromagnetic waves, is detuning the resonant tag 260, i.e., the second part 120 is separated from the first part 110 to pass between the pass portions 226 and 236 of the pair of guides 220 and 230 to stop. Such a case where the second part 120 passes between the pass portions 226 and 236 to stop occurs when the article 1300 has received a shock without inclining beyond the limit for inclination, or has inclined after receiving a shock even if it has inclined beyond the limit for inclination. Thus, in this case where the resonant frequency has not been detected, it can be determined that the article 1300 has received a shock without inclining beyond the limit for inclination, or has inclined after receiving a shock even if it has inclined beyond the limit for inclination, and such a determination is made. This determination is also made by an existing computer-controlled logistics monitoring system that is improved so as to carry out the detection method according to the present invention in a case where the detection gate 1400 has not output a detection signal when having not detected the resonant frequency, as described above.

In this case where the resonant frequency has not been detected, it is preferable to further visually observe the first part 110 and the second part 120 of the indicator 100 in the detector 1000 through the cover 240 to make a determination in the following way. When the first part 110 is held between the slope portions 225 and 235 and separated from the second part 120, it can be determined that the article 1300 has not inclined beyond the limit for inclination but has received a shock, and thus such a determination is made. Moreover, when the first part 110 has moved away from the guides 220 and 230 and is separated from the second part 120, it can be determined that the article 1300 has inclined beyond the limit for inclination, after receiving a shock, and thus such a determination is made.

On the other hand, when the detection gate 1400 has detected the resonant frequency of the resonant tag 260, it is preferable to further visually observe the first part 110 and the second part 120 of the indicator 100 in the detector 1000 through the cover 240 to make a determination in the following way. When the first part 110 and the second part 120 are joined together and held between the slope portions 225 and 235, it can be determined that the article 1300 has not inclined beyond the limit for inclination nor received a shock, and thus such a determination is made. Moreover, when the first part 110 and the second part 120 have moved away from the guides 220 and 230, the first part 110 and the second part 120 being joined together, it can be determined that the article 1300 has inclined beyond the limit for inclination, and thus such a determination is made. Moreover, when the first part 110 has moved away from the guides 220 and 230 and is separated from the second part 120, it can be determined that the article 1300 has received a shock, after having inclined beyond the limit for inclination, and thus such a determination is made.

Moreover, when the detector 1100, in which the pair of resonant tags 270 and 275 are provided, shown in FIG. 11 is used, a tumble of and a shock to an article can be detected using a detection gate. A method for detecting a tumble of and a shock to an article using the detector 1100 will now be described as yet another embodiment according to the present invention. Using the detector 1100, the detector 1100 is first prepared by setting the indicator 100 on the pair of guides 220 and 230. Then, in the same way as the aforementioned method, in which the detector 800 is used, the detector 1100 having been prepared is fixed to an upper position of the article 1300 with the longitudinal direction of the detector 1100 correspondent to the height direction of the article 1300. In view of a tumble of the article 1300 in two directions, i.e., the forward-backward direction and the left-right direction, the detector 1100 is fixed to two positions on adjacent sides of the article 1300. Then, after the article 1300 is moved by, for example, transportation, the article 1300 is passed through two different detection gates 1400 and 1500 that detect different resonant frequencies of a pair of resonant tags, respectively, as shown in FIG. 15, to detect the presence or absence of the resonant frequency of each of the pair of resonant tags 270 and 275. The detection gate 1500 includes an electromagnetic wave transmitting antenna 1510 and an electromagnetic wave receiving antenna 1520, as in the case of the detection gate 1400.

When both of the two detection gates 1400 and 1500 have detected the resonant frequencies of the resonant tags 270 and 275 in the detector 1100, respectively, the second part 120, which shields electromagnetic waves, is not detuning either of the resonant tags 270 and 275, i.e., the second part 120 is held between the slope portions 225 and 235 of the pair of guides 220 and 230, or the second part 120 is separated from the first part 110 to pass between the pass portions 226 and 236 of the guides 220 and 230 to stop. Such a case where the second part 120 is held between the slope portions 225 and 235, or the second part 120 is separated from the first part 110 to pass between the pass portions 226 and 236 to stop occurs when the article 1300 has not received a shock or has received a shock without inclining beyond the limit for inclination, or has inclined after receiving a shock even if it has inclined beyond the limit for inclination. Thus, in this case where both of the resonant frequencies have been detected, it can be determined that the article 1300 has not received a shock or has received a shock without inclining beyond the limit for inclination, or has inclined after receiving a shock even if it has inclined beyond the limit for inclination, and such a determination is made. This determination is also made by an existing computer-controlled logistics monitoring system that is improved so as to carry out the detection method according to the present invention in response to detection signals output when both of the detection gates 1400 and 1500 have detected the resonant frequencies, as described above.

In this case where both of the two detection gates 1400 and 1500 have detected the resonant frequencies, respectively, it is preferable to further visually observe the first part 110 and the second part 120 of the indicator 100 in the detector 1100 through the cover 240 to make a determination in the following way. When the first part 110 and the second part 120 are joined together and held between the slope portions 225 and 235, it can be determined that the article 1300 has not inclined beyond the limit for inclination nor received a shock, and thus such a determination is made. Moreover, when the first part 110 is held between the slope portions 225 and 235 and separated from the second part 120, it can be determined that the article 1300 has not inclined beyond the limit for inclination but has received a shock, and thus such a determination is made. Moreover, when the first part 110 has moved away from the guides 220 and 230 and is separated from the second part 120, it can be determined that the article 1300 has inclined beyond the limit for inclination, after receiving a shock, and thus such a determination is made.

On the other hand, when one of the two detection gates 1400 and 1500 has not detected corresponding one of the resonant frequencies of the resonant tags 270 and 275, the second part 120, which shields electromagnetic waves, is detuning one of the resonant tags 270 and 275, i.e., the second part 120 is held in one of the capture portions 227 and 237 of the guides 220 and 230. Such a case where the second part 120 is held in one of the capture portions 227 and 237 occurs when the article 1300 has inclined beyond the limit for inclination in a direction toward the resonant tag not having detected it. Thus, in this case where one of the resonant frequencies has not been detected, it can be determined that the article 1300 has inclined beyond the limit for inclination in a direction toward the resonant tag not having detected it, and such a determination is made. This determination is also made by an existing computer-controlled logistics monitoring system that is improved so as to carry out the detection method according to the present invention in a case where one of the detection gates 1400 and 1500 has not output a detection signal when having not detected the resonant frequency.

In this case where one of the two detection gates 1400 and 1500 has not detected corresponding one of the resonant frequencies, it is preferable to further visually observe the first part 110 and the second part 120 of the indicator 100 in the detector 1100 through the cover 240 to make a determination in the following way. When the first part 110 and the second part 120 join together, it can be determined that the article 1300 has not received a shock, and thus such a determination is made. Moreover, when the first part 110 and the second part 120 are separated from each other, it can be determined that the article 1300 has received a shock, and thus such a determination is made.

Moreover, when the detector 1200, in which the pair of resonant tags 280 and 285 are provided, shown in FIG. 12 is used, a tumble of and a shock to an article can be detected using a detection gate. A method for detecting a tumble of and a shock to an article using the detector 1200 will now be described as yet another embodiment according to the present invention. Using the detector 1200, the detector 1200 is first prepared by setting the indicator 100 on the pair of guides 220 and 230. Then, in the same way as the aforementioned method, in which the detector 800 is used, the detector 1200 having been prepared is fixed to an upper position of the article 1300 with the longitudinal direction of the detector 1200 correspondent to the height direction of the article 1300. In view of a tumble of the article 1300 in two directions, i.e., the forward-backward direction and the left-right direction, the detector 1200 is fixed to two positions on adjacent sides of the article 1300. Then, after the article 1300 is moved by, for example, transportation, the article 1300 is passed through the two different detection gates 1400 and 1500, as shown in FIG. 15, to detect the presence or absence of the resonant frequency of each of the pair of resonant tags 280 and 285.

When both of the two detection gates 1400 and 1500 have detected the resonant frequencies of the resonant tags 280 and 285 in the detector 1200, respectively, the second part 120, which shields electromagnetic waves, is not detuning either of the resonant tags 280 and 285, i.e., the second part 120 is separated from the first part 110 to pass between the pass portions 226 and 236 of the guides 220 and 230 to stop. Such a case where the second part 120 is separated from the first part 110 to pass between the pass portions 226 and 236 to stop occurs when the article 1300 has received a shock without inclining beyond the limit for inclination, or has inclined after receiving a shock even if it has inclined beyond the limit for inclination. Thus, in this case where both of the resonant frequencies have been detected, it can be determined that the article 1300 has received a shock without inclining beyond the limit for inclination, or has inclined after receiving a shock even if it has inclined beyond the limit for inclination, and such a determination is made. This determination is also made by an existing computer-controlled logistics monitoring system that is improved so as to carry out the detection method according to the present invention in response to detection signals output when both of the detection gates 1400 and 1500 have detected the resonant frequencies, as described above.

In this case where both of the two detection gates 1400 and 1500 have detected the resonant frequencies, respectively, it is preferable to further visually observe the first part 110 and the second part 120 of the indicator 100 in the detector 1200 through the cover 240 to make a determination in the following way. When the first part 110 is held between the slope portions 225 and 235 and separated from the second part 120, it can be determined that the article 1300 has not inclined beyond the limit for inclination but has received a shock, and thus such a determination is made. Moreover, when the first part 110 has moved away from the guides 220 and 230 and is separated from the second part 120, it can be determined that the article 1300 has inclined beyond the limit for inclination, after receiving a shock, and thus such a determination is made.

On the other hand, when one of the two detection gates 1400 and 1500 has not detected corresponding one of the resonant frequencies of the resonant tags 280 and 285, the second part 120, which shields electromagnetic waves, is detuning one of the resonant tags 280 and 285, i.e., the second part 120 is held in one of the capture portions 227 and 237 of the pair of guides 220 and 230. Such a case where the second part 120 is held in one of the capture portions 227 and 237 occurs when the article 1300 has inclined beyond the limit for inclination in a direction toward the resonant tag not having detected it. Thus, in this case where one of the resonant frequencies has not been detected, it can be determined that the article 1300 has inclined beyond the limit for inclination in a direction toward the resonant tag not having detected it, and such a determination is made. This determination is also made by an existing computer-controlled logistics monitoring system that is improved so as to carry out the detection method according to the present invention in a case where one of the detection gates 1400 and 1500 has not output a detection signal when having not detected the resonant frequency.

In this case where one of the two detection gates 1400 and 1500 has not detected corresponding one of the resonant frequencies, it is preferable to further visually observe the first part 110 and the second part 120 of the indicator 100 in the detector 1200 through the cover 240 to make a determination in the following way. When the first part 110 and the second part 120 join together, it can be determined that the article 1300 has not received a shock, and thus such a determination is made. Moreover, when the first part 110 and the second part 120 are separated from each other, it can be determined that the article 1300 has received a shock, and thus such a determination is made.

When either of the two detection gates 1400 and 1500 has not detected the resonant frequencies of the resonant tags 280 and 285 in the detector 1200, the second part 120, which shields electromagnetic waves, is detuning both of the resonant tags 280 and 285, i.e., the second part 120 is joined to the first part 110 and held between the slope portions 225 and 235 of the pair of guides 220 and 230. Such a case where the second part 120 is held between the slope portions 225 and 235 occurs when the article 1300 has not inclined beyond the limit for inclination nor received a shock. Thus, in this case where either of the resonant frequencies has not been detected, it can be determined that the article 1300 has not inclined beyond the limit for inclination nor received a shock, and thus such a determination is made. This determination is also made by an existing computer-controlled logistics monitoring system that is improved so as to carry out the detection method according to the present invention in a case where either of the detection gates 1400 and 1500 has not output a detection signal when having not detected the resonant frequency.

Regarding the indicators 300 to 700 shown as the first to fifth examples of the indicator 100 according to an embodiment of the present invention, experiments were performed to determine whether the joined disks corresponding to the first part 110 and the second part 120 of the indicator 100 actually separate upon receiving a shock. For each of the indicators, an experiment in which the indicator is set in the detector 800 shown in FIG. 8, and a shock is given to the detector 800 having been set up, using a drop shock tester (type of shock: free fall) was performed.

An iron L-shaped angle was fixed to the center of the surface of a table of the drop shock tester with bolts. A boundary point where separation occurs in an indicator was examined with the height of equivalent free fall (cm) being changed while the velocity change was measured with an acceleration sensor fixed on the surface of the table. Simultaneously, the shock value (peak acceleration) was measured, and the acceleration at the time of separation occurring in the indicator was measured. In each of the indicators 500 to 700 in the third to fifth examples, since the mechanism for separating the joined disks from each other is based on breakage upon a shock, the duration time was set to 3 msec or less. For each drop shock test of a prototype of each of the indicators, separation of the disks of the indicator was visually checked.

In each drop shock test of a prototype of each of the indicators, after the table was made ready to be dropped, the detector 800 was inclined rightward (or leftward) on the table with the detector 800 in hand. It was checked that the indicator was held in the capture portion of the guide on the right side, and the disks of the indicator stayed in the capture portion without being separated from each other when the original condition was restored. Then, the indicator was placed back to its original position between the slope portions of the guides by shaking the detector 800 by hand. The indicator was further inclined in the opposite direction, and then it was checked that the indicator was held in the capture portion without separation. Then, the indicator was again placed back to its initial position by shaking the detector 800 by hand. Subsequently, the detector 800 was moved quietly onto the table, and the back face of the detector 800 was attached to the vertical surface of the L-shaped angle fixed on the table, a double-faced adhesive tape being attached to the vertical surface. At this time, the bottom face of the detector 800 was placed in direct contact with the surface of the table. Subsequently, the table was raised up to an equivalent free fall height that was set and then dropped from the equivalent free fall height. After the table was dropped, it was visually checked whether separation had occurred in the indicator. Simultaneously, data of a generated acceleration and a duration time was obtained using the acceleration sensor fixed on the surface of the table. When the height of equivalent free fall was increased little by little, the disks of the indicator were separated from each other. Separation does not always occur at the same height of equivalent free fall. Thus, each experiment was performed with the height of equivalent free fall being increased until separation completely occurred.

Experiment 1

Prototypes of the indicator 300 were prepared. A PVC resin disk measuring 23.1 mm in diameter and 0.8 mm in thickness and weighing 0.5 g was used as the resin disk 310 corresponding to the first part 110. Regarding the metal disk 320 and the magnet disk 330, which constitute two portions that are joined together by a magnetic force, corresponding to the second part 120, an iron disk measuring 19.4 mm in diameter and 2.3 mm in thickness and weighing 5 g was used as the metal disk 320, and a magnet disk measuring 19.4 mm in diameter and 1 mm in thickness and weighing 0.7 g was used as the magnet disk 330. Three prototypes #1, #2, and #3 were tested with five different heights of equivalent free fall of 9 cm, 7 cm, 5 cm, 3 cm, and 2.5 cm. Table 1 shows the data of the experimental results.

TABLE 1

| No. | Prototype No. | Generated Acceleration (G) | Duration Time (msec) | Velocity Change (m/s) | Separation | Height of Equivalent Free Fall (cm) |
|---|---|---|---|---|---|---|
| 1 | Prototype #1 | 77 | 3.8 | 1.66 | YES | 9 |
|   | Prototype #2 | 83 | 3.8 | 1.64 | YES |   |
|   | Prototype #3 | 81 | 3.8 | 1.63 | YES |   |
| 2 | Prototype #1 | 62 | 4.2 | 1.4 | YES | 7 |
|   | Prototype #2 | 66 | 4.2 | 1.45 | YES |   |
|   | Prototype #3 | 66 | 4.1 | 1.45 | YES |   |
| 3 | Prototype #1 | 49 | 4.8 | 1.24 | YES | 5 |
|   | Prototype #2 | 53 | 4.7 | 1.25 | YES |   |
|   | Prototype #3 | 49 | 4.8 | 1.25 | YES |   |
| 4 | Prototype #1 | 28 | 6.2 | 0.92 | YES | 3 |
|   | Prototype #2 | 29 | 6.2 | 0.91 | YES |   |
|   | Prototype #3 | 28 | 6 | 0.98 | NO |   |
| 5 | Prototype #1 | 25 | 6.7 | 0.88 | NO | 2.5 |
|   | Prototype #2 | 25 | 6.7 | 0.88 | NO |   |
|   | Prototype #3 | 27 | 6.7 | 0.81 | NO |   |

The data of the experimental results shown in Table 1 is sorted in order of velocity change and shown in Table 2. Table 2 shows that, in the tested prototypes, when the velocity change exceeds 0.9 m/s, the PVC resin disk, the iron disk, and the magnet disk separate.

TABLE 2

| No. | Prototype No. | Generated Acceleration (G) | Duration Time (msec) | Velocity Change (m/s) | Separation | Height of Equivalent Free Fall (cm) |
|---|---|---|---|---|---|---|
| 5 | Prototype #3 | 27 | 6.7 | 0.81 | NO | 2.5 |
| 5 | Prototype #1 | 25 | 6.7 | 0.88 | NO | 2.5 |
| 5 | Prototype #2 | 25 | 6.7 | 0.88 | NO | 2.5 |
| 4 | Prototype #2 | 29 | 6.2 | 0.91 | YES | 3 |
| 4 | Prototype #1 | 28 | 6.2 | 0.92 | YES | 3 |
| 4 | Prototype #3 | 28 | 6 | 0.98 | NO | 3 |
| 3 | Prototype #1 | 49 | 4.8 | 1.24 | YES | 5 |
| 3 | Prototype #2 | 53 | 4.7 | 1.25 | YES | 5 |
| 3 | Prototype #3 | 49 | 4.8 | 1.25 | YES | 5 |
| 2 | Prototype #1 | 62 | 4.2 | 1.4 | YES | 7 |
| 2 | Prototype #2 | 66 | 4.2 | 1.45 | YES | 7 |
| 2 | Prototype #3 | 66 | 4.1 | 1.45 | YES | 7 |
| 1 | Prototype #3 | 81 | 3.8 | 1.63 | YES | 9 |
| 1 | Prototype #2 | 83 | 3.8 | 1.64 | YES | 9 |
| 1 | Prototype #1 | 77 | 3.8 | 1.66 | YES | 9 |

Experiment 2

Prototypes of the indicator 400 were prepared. A PVC resin disk measuring 23.1 mm in diameter and 0.8 mm in thickness and weighing 0.5 g was used as the resin disk 410 corresponding to the first part 110. Regarding the magnet disks 420 and 430, which constitute two portions that are joined together by a magnetic force, corresponding to the second part 120, a north/south pole magnet disk measuring 19.4 mm in diameter and 1 mm in thickness and weighing 0.7 g was used as the magnet disk 420, and a north/south pole magnet disk measuring 19.4 mm in diameter and 2 mm in thickness and weighing 1.4 g was used as the magnet disk 430. Three prototypes #1, #2, and #3 were tested with five different heights of equivalent free fall of 18 cm, 15 cm, 12 cm, 9 cm, and 7 cm. Table 3 shows the data of the experimental results.

TABLE 3

| No. | Prototype No. | Generated Acceleration (G) | Duration Time (msec) | Velocity Change (m/s) | Separation | Height of Equivalent Free Fall (cm) |
|---|---|---|---|---|---|---|
| 1 | Prototype #1 | 170 | 3 | 2.45 | YES | 18 |
| 1 | Prototype #2 | 168 | 3.1 | 2.44 | YES |  |
| 1 | Prototype #3 | 174 | 3.1 | 2.4 | YES |  |
| 2 | Prototype #1 | 144 | 3.1 | 2.18 | YES | 15 |
| 2 | Prototype #2 | 145 | 3.1 | 2.28 | YES |  |
| 2 | Prototype #3 | 148 | 3.1 | 2.27 | NO |  |
| 3 | Prototype #1 | 122 | 3.4 | 2.01 | YES | 12 |
| 3 | Prototype #2 | 119 | 3.4 | 2 | NO |  |
| 3 | Prototype #3 | 122 | 3.2 | 1.98 | NO |  |
| 4 | Prototype #1 | 85 | 3.8 | 1.62 | NO | 9 |
| 4 | Prototype #2 | 75 | 3.8 | 1.76 | YES |  |
| 4 | Prototype #3 | 77 | 3.7 | 1.68 | NO |  |
| 5 | Prototype #1 | 63 | 4.3 | 1.43 | NO | 7 |
| 5 | Prototype #2 | 63 | 4.3 | 1.44 | NO |  |
| 5 | Prototype #3 | 64 | 4.3 | 1.43 | NO |  |

The data of the experimental results shown in Table 3 is sorted in order of velocity change and shown in Table 4. Table 4 shows that, in the tested prototypes, when the velocity change exceeds 2.0 m/s, the PVC resin disk and the two north/south pole magnet disks separate.

TABLE 4

| No. | Prototype No. | Generated Acceleration (G) | Duration Time (msec) | Velocity Change (m/s) | Separation | Height of Equivalent Free Fall (cm) |
|---|---|---|---|---|---|---|
| 5 | Prototype #1 | 63 | 4.3 | 1.43 | NO | 7 |
| 5 | Prototype #3 | 64 | 4.3 | 1.43 | NO | 7 |
| 5 | Prototype #2 | 63 | 4.3 | 1.44 | NO | 7 |
| 4 | Prototype #1 | 85 | 3.8 | 1.62 | NO | 9 |
| 4 | Prototype #3 | 77 | 3.7 | 1.68 | NO | 9 |
| 4 | Prototype #2 | 75 | 3.8 | 1.76 | YES | 9 |
| 3 | Prototype #3 | 122 | 3.2 | 1.98 | NO | 12 |
| 3 | Prototype #2 | 119 | 3.4 | 2 | NO | 12 |
| 3 | Prototype #1 | 122 | 3.4 | 2.01 | YES | 12 |
| 2 | Prototype #1 | 144 | 3.1 | 2.18 | YES | 15 |
| 2 | Prototype #3 | 148 | 3.1 | 2.27 | NO | 15 |
| 2 | Prototype #2 | 145 | 3.1 | 2.28 | YES | 15 |
| 1 | Prototype #3 | 174 | 3.1 | 2.4 | YES | 18 |
| 1 | Prototype #2 | 168 | 3.1 | 2.44 | YES | 18 |
| 1 | Prototype #1 | 170 | 3 | 2.45 | YES | 18 |

Experiment 3

Prototypes of the indicator 500 were prepared. An ABS resin disk measuring 23.1 mm in diameter and 2.3 mm in thickness, weighing 1.3 g, and having an aperture measuring 0.95 mm in diameter at its center was used as the resin disk 510 corresponding to the first part 110. An iron disk measuring 19.4 mm in diameter and 2.3 mm in thickness, weighing 5 g, and having an aperture measuring 1 mm in diameter at its center was used as the metal disk 520 corresponding to the second part 120. Moreover, a graphite core measuring 0.9 mm in diameter and 4.5 mm in length and weighing 0.008 g was used as the linear member 530 corresponding to the joining portion. The graphite core is inserted into the apertures located at the individual centers of the ABS resin disk and the iron disk to be fixed. Three prototypes #1, #2, and #3 were tested with five different heights of equivalent free fall of 38 cm, 33 cm, 30 cm, 26 cm, and 22 cm. Table 5 shows the data of the experimental results.

TABLE 5

| No. | Prototype No. | Generated Acceleration (G) | Duration Time (msec) | Velocity Change (m/s) | Breakage | Height of Equivalent Free Fall (cm) |
|---|---|---|---|---|---|---|
| 1 | Prototype #1 | 327 | 2.7 | 3.75 | YES | 38 |
|   | Prototype #2 | 339 | 2.7 | 3.88 | YES |   |
|   | Prototype #3 | 343 | 1.7 | 3.79 | YES |   |
| 2 | Prototype #1 | 287 | 2.7 | 3.39 | YES | 33 |
|   | Prototype #2 | 288 | 2.8 | 3.37 | YES |   |
|   | Prototype #3 | 294 | 2.8 | 3.5 | YES |   |
| 3 | Prototype #1 | 267 | 2.8 | 3.24 | YES | 30 |
|   | Prototype #2 | 264 | 2.8 | 3.31 | YES |   |
|   | Prototype #3 | 268 | 2.8 | 3.28 | YES |   |
| 4 | Prototype #1 | 229 | 2.9 | 3.01 | YES | 26 |
|   | Prototype #2 | 234 | 2.9 | 3.03 | NO |   |
|   | Prototype #3 | 237 | 2.9 | 3.02 | YES |   |
| 5 | Prototype #1 | 206 | 2.9 | 2.76 | NO | 22 |
|   | Prototype #2 | 204 | 2.9 | 2.7 | NO |   |
|   | Prototype #3 | 210 | 3 | 2.9 | YES |   |

The data of the experimental results shown in Table 5 is sorted in order of velocity change and shown in Table 6. Table 6 shows that, in the tested prototypes, when the velocity change exceeds 3.0 m/s, the graphite core is broken, so that the ABS resin disk and the iron disk separate.

TABLE 6

| No. | Prototype No. | Generated Acceleration (G) | Duration Time (msec) | Velocity Change (m/s) | Breakage | Height of Equivalent Free Fall (cm) |
|---|---|---|---|---|---|---|
| 5 | Prototype #2 | 204 | 2.9 | 2.7 | NO | 22 |
| 5 | Prototype #1 | 206 | 2.9 | 2.76 | NO | 22 |
| 5 | Prototype #3 | 210 | 3 | 2.9 | YES | 22 |
| 4 | Prototype #1 | 229 | 2.9 | 3.01 | YES | 26 |
| 4 | Prototype #3 | 237 | 2.9 | 3.02 | YES | 26 |
| 4 | Prototype #2 | 234 | 2.9 | 3.03 | NO | 26 |
| 3 | Prototype #1 | 267 | 2.8 | 3.24 | YES | 30 |
| 3 | Prototype #3 | 268 | 2.8 | 3.28 | YES | 30 |
| 3 | Prototype #2 | 264 | 2.8 | 3.31 | YES | 30 |
| 2 | Prototype #2 | 288 | 2.8 | 3.37 | YES | 33 |

TABLE 6-continued

| No. | Prototype No. | Generated Acceleration (G) | Duration Time (msec) | Velocity Change (m/s) | Breakage | Height of Equivalent Free Fall (cm) |
|---|---|---|---|---|---|---|
| 2 | Prototype #1 | 287 | 2.7 | 3.39 | YES | 33 |
| 2 | Prototype #3 | 294 | 2.8 | 3.5 | YES | 33 |
| 1 | Prototype #1 | 327 | 2.7 | 3.75 | YES | 38 |
| 1 | Prototype #3 | 343 | 1.7 | 3.79 | YES | 38 |
| 1 | Prototype #2 | 339 | 2.7 | 3.88 | YES | 38 |

Experiment 4

Prototypes of the indicator 600 were prepared. An ABS resin disk measuring 23.1 mm in diameter and 1.8 mm in thickness, weighing 1.0 g, and having the four junction protrusions 615 in four (north, south, east, and west) positions on one surface thereof was used as the resin disk 610 corresponding to the first part 110. An iron disk measuring 19.4 mm in diameter and 4.6 mm in thickness and weighing 10 g was used as the metal disk 620 corresponding to the second part 120. Moreover, a commercially available instant adhesive, a bit of which was applied to two of the four junction protrusions 615 opposing each other, was used as the bonding members 630 corresponding to the joining portion. Three prototypes #1, #2, and #3 were tested with five different heights of equivalent free fall of 36 cm, 33 cm, 30 cm, 26 cm, and 22 cm. Table 7 shows the data of the experimental results.

TABLE 7

| No. | Prototype No. | Generated Acceleration (G) | Duration Time (msec) | Velocity Change (m/s) | Separation | Height of Equivalent Free Fall (cm) |
|---|---|---|---|---|---|---|
| 1 | Prototype #1 | 307 | 2.8 | 3.63 | YES | 36 |
|   | Prototype #2 | 312 | 2.8 | 3.61 | YES |   |
|   | Prototype #3 | 306 | 2.8 | 3.6 | YES |   |
| 2 | Prototype #1 | 290 | 1.9 | 3.5 | YES | 33 |
|   | Prototype #2 | 282 | 1.9 | 3.56 | YES |   |
|   | Prototype #3 | 285 | 1.8 | 3.52 | NO |   |
| 3 | Prototype #1 | 268 | 2.8 | 3.32 | NO | 30 |
|   | Prototype #2 | 274 | 2.9 | 3.3 | NO |   |
|   | Prototype #3 | 265 | 2.9 | 3.35 | NO |   |
| 4 | Prototype #1 | 226 | 2.8 | 3 | NO | 26 |
|   | Prototype #2 | 229 | 2.9 | 2.84 | NO |   |
|   | Prototype #3 | 228 | 2.7 | 3.02 | NO |   |
| 5 | Prototype #1 | 193 | 1.9 | 2.8 | NO | 22 |
|   | Prototype #2 | 199 | 2 | 2.76 | NO |   |
|   | Prototype #3 | 201 | 1.9 | 2.87 | NO |   |

The data of the experimental results shown in Table 7 is sorted in order of velocity change and shown in Table 8. Table 8 shows that, in the tested prototypes, when the velocity change exceeds 3.5 m/s, the instant adhesive is peeled off, so that the ABS resin disk and the iron disk separate.

TABLE 8

| No. | Prototype No. | Generated Acceleration (G) | Duration Time (msec) | Velocity Change (m/s) | Separation | Height of Equivalent Free Fall (cm) |
|---|---|---|---|---|---|---|
| 5 | Prototype #2 | 199 | 2 | 2.76 | NO | 22 |
| 5 | Prototype #1 | 193 | 1.9 | 2.8 | NO | 22 |
| 4 | Prototype #2 | 229 | 2.9 | 2.84 | NO | 26 |
| 5 | Prototype #3 | 201 | 1.9 | 2.87 | NO | 22 |
| 4 | Prototype #1 | 226 | 2.8 | 3 | NO | 26 |
| 4 | Prototype #3 | 228 | 2.7 | 3.02 | NO | 26 |
| 3 | Prototype #2 | 274 | 2.9 | 3.3 | NO | 30 |
| 3 | Prototype #1 | 268 | 2.8 | 3.32 | NO | 30 |
| 3 | Prototype #3 | 265 | 2.9 | 3.35 | NO | 30 |
| 2 | Prototype #1 | 290 | 1.9 | 3.5 | YES | 33 |
| 2 | Prototype #3 | 285 | 1.8 | 3.52 | NO | 33 |
| 2 | Prototype #2 | 282 | 1.9 | 3.56 | YES | 33 |
| 1 | Prototype #3 | 306 | 2.8 | 3.6 | YES | 36 |
| 1 | Prototype #2 | 312 | 2.8 | 3.61 | YES | 36 |
| 1 | Prototype #1 | 307 | 2.8 | 3.63 | YES | 36 |

Experiment 5

Prototypes of the indicator 700 were prepared. An ABS resin disk measuring 23.1 mm in diameter and 2.3 mm in thickness, weighing 1.3 g, and having the supporting protrusion 715 measuring 2.6 mm in length and 0.95 mm in diameter at the center of one surface thereof was used as the resin disk 710 corresponding to the first part 110. An iron disk measuring 19.4 mm in diameter and 4.6 mm in thickness, weighing 10 g, and having the aperture 725 measuring 1 mm in diameter at its center was used as the metal disk 720 corresponding to the second part 120. The supporting protrusion 715 was fitted into the aperture 725 to be fixed. Three prototypes #1, #2, and #3 were tested with five different heights of equivalent free fall of 36 cm, 33 cm, 30 cm, 26 cm, and 22 cm. Table 9 shows the data of the experimental results.

TABLE 9

| No. | Prototype No. | Generated Acceleration (G) | Duration Time (msec) | Velocity Change (m/s) | Breakage | Height of Equivalent Free Fall (cm) |
|---|---|---|---|---|---|---|
| 1 | Prototype #1 | 308 | 2.8 | 3.62 | YES | 36 |
|   | Prototype #2 | 307 | 2.8 | 3.63 | YES |    |
|   | Prototype #3 | 311 | 2.8 | 3.61 | NO  |    |
| 2 | Prototype #1 | 292 | 2.8 | 3.52 | YES | 33 |
|   | Prototype #2 | 287 | 2.7 | 3.55 | YES |    |
|   | Prototype #3 | 293 | 2.9 | 3.49 | NO  |    |
| 3 | Prototype #1 | 267 | 2.8 | 3.23 | NO  | 30 |
|   | Prototype #2 | 266 | 2.8 | 3.25 | YES |    |
|   | Prototype #3 | 278 | 2.8 | 3.3  | NO  |    |
| 4 | Prototype #1 | 228 | 2.9 | 3    | NO  | 26 |
|   | Prototype #2 | 222 | 2.9 | 2.84 | NO  |    |
|   | Prototype #3 | 223 | 3   | 3.01 | NO  |    |
| 5 | Prototype #1 | 194 | 3   | 2.69 | NO  | 22 |
|   | Prototype #2 | 194 | 2.9 | 2.77 | NO  |    |
|   | Prototype #3 | 195 | 2.9 | 2.8  | NO  |    |

The data of the experimental results shown in Table 9 is sorted in order of velocity change and shown in Table 10. Table 10 shows that, in the tested prototypes, when the velocity change exceeds 3.3 m/s, the supporting protrusion is sheared, so that the ABS resin disk and the iron disk separate.

TABLE 10

| No. | Prototype No. | Generated Acceleration (G) | Duration Time (msec) | Velocity Change (m/s) | Breakage | Height of Equivalent Free Fall (cm) |
|---|---|---|---|---|---|---|
| 5 | Prototype #1 | 194 | 3   | 2.69 | NO  | 22 |
| 5 | Prototype #2 | 194 | 2.9 | 2.77 | NO  | 22 |
| 5 | Prototype #3 | 195 | 2.9 | 2.8  | NO  | 22 |
| 4 | Prototype #2 | 222 | 2.9 | 2.84 | NO  | 26 |
| 4 | Prototype #1 | 228 | 2.9 | 3    | NO  | 26 |
| 4 | Prototype #3 | 223 | 3   | 3.01 | NO  | 26 |
| 3 | Prototype #1 | 267 | 2.8 | 3.23 | NO  | 30 |
| 3 | Prototype #2 | 266 | 2.8 | 3.25 | YES | 30 |
| 3 | Prototype #3 | 278 | 2.8 | 3.3  | NO  | 30 |
| 2 | Prototype #3 | 293 | 2.9 | 3.49 | NO  | 33 |
| 2 | Prototype #1 | 292 | 2.8 | 3.52 | YES | 33 |
| 2 | Prototype #2 | 287 | 2.7 | 3.55 | YES | 33 |
| 1 | Prototype #3 | 311 | 2.8 | 3.61 | NO  | 36 |

TABLE 10-continued

| No. | Prototype No. | Generated Acceleration (G) | Duration Time (msec) | Velocity Change (m/s) | Breakage | Height of Equivalent Free Fall (cm) |
|---|---|---|---|---|---|---|
| 1 | Prototype #1 | 308 | 2.8 | 3.62 | YES | 36 |
| 1 | Prototype #2 | 307 | 2.8 | 3.63 | YES | 36 |

It was observed that, in separation of disks of an indicator upon a drop shock, the velocity change is affected by the acceleration and the duration time during which the acceleration exists, i.e., a value obtained by summing up the acceleration and the duration time. According to Experiments 1 to 5, the intensity of shock on an indicator can be evaluated only with the velocity change. Thus, when the obtained data of the experimental results is sorted in order of velocity change, it can be found that disks of an indicator separate at a high rate in a predetermined range of velocity change. Actually, it was confirmed that disks of an indicator were separated from each other in a range of velocity change exceeding 0.9 m/s in Experiment 1, a range of velocity change exceeding 2.0 m/s in Experiment 2, a range of velocity change exceeding 3.0 m/s in Experiment 3, a range of velocity change exceeding 3.5 m/s in Experiment 4, and a range of velocity change exceeding 3.3 m/s in Experiment 5. The confirmed velocity change shows that, even in the case of a very high acceleration (shock value (peak acceleration)) having a short duration time, when the velocity change (energy value) obtained by summing up the acceleration and the duration time does not exceed the aforementioned values, separation of disks due to breakage by shearing or peeling does not occur. Conversely, the confirmed velocity change shows that, even in the case of a low acceleration (shock value (peak acceleration)), in a shock waveform having a very long duration time, when the velocity change (energy value) obtained by summing up the acceleration and the duration time exceeds the aforementioned values, separation shock value (peak acceleration) of disks due to breakage by shearing or peeling occurs.

In the prototypes based on each of the examples of the indicator according to the present invention, corresponding one of these ranges can be determined as being a boundary where separation occurs. In the experiments, a boundary value that defines a range of velocity change in which disks of an indicator separate falls within a narrow range. This means that an indicator that is constructed according to the present invention is highly useful in that the indicator can reliably and repeatedly detect a shock of a predetermined intensity as a detection indicator that detects not only inclination but also a shock. In this case, whether binding of disks of an indicator, especially, a joining portion, has been deteriorated due to rolling or sliding of the indicator can be determined by comparing the indicator with that having not been subjected to an inclination experiment. In additional experiments, significant deterioration was not observed.

While the present invention has been described via the embodiments, the technical scope of the present invention is not limited to the scope described in the foregoing embodiments. Various changes or improvements can be made in the foregoing embodiments, and it is obvious that the embodiments that are changed or improved are also covered by the technical scope of the present invention.

Regarding the constitution of the present invention, the following particulars are disclosed as the summary.

(1) An indicator moving away from a holding guide in a detector when the detector inclines and goes beyond a limit for inclination, including:

a first part in the shape of rolling on the holding guide when the detector inclines; and a second part smaller than the first part and in the shape of not preventing the first part from rolling, wherein the first part and the second part join together and separate when receiving a shock.

2. The indicator according to Claim 1, wherein the second part includes two portions that join together by a magnetic force, the first part is sandwiched between the two portions and joins to the second part, and the two portions separate from the first part when receiving a shock.

(2) The indicator according to (1), wherein the second part includes two portions that join together by a magnetic force, the first part is sandwiched between the two portions and joins to the second part, and the two portions separate from the first part when receiving a shock.

(3) The indicator according to (2), wherein at least one of the two portions includes a magnet.

(4) The indicator according to (3), wherein each of the two portions includes a magnet that includes a plurality of north poles and south poles.

(5) The indicator according any one of (2) to (4), wherein the first part includes a holding protrusion at or near its barycenter, and one of the two portions includes a recess corresponding to the holding protrusion.

(6) The indicator according to (1), further including a joining portion by which the first part and the second part are joined together, wherein the joining portion breaks upon receiving a shock, and separates the first part and the second part from each other.

(7) The indicator according to (6), wherein the joining portion includes a linear member by which the first part and the second part are joined together at or near their respective barycenters.

(8) The indicator according to (7), wherein the linear member includes a graphite core.

(9) The indicator according to (6), wherein the joining portion includes a bonding member by which the first part and the second part are joined together at their respective contact surfaces.

(10) The indicator according to (9), wherein the contact surface of the first part includes a junction protrusion formed on a surface of the first part.

(11) The indicator according to (6), wherein the joining portion includes a supporting protrusion that protrudes from a surface of the first part and supports the second part.

(12) The indicator according to (11), wherein the supporting protrusion is formed at or near the barycenter of the first part, an aperture corresponding to the supporting protrusion is formed at or near the barycenter of the second part, and the supporting protrusion is fitted into the aperture to be fixed.

(13) The indicator according to any one of (1) to (12), wherein the first part is disk-shaped, and the second part is a flat plate.

(14) The indicator according to (13), wherein the flat plate is a disk.

(15) The indicator according to any one of (1) to (14), wherein the first part transmits electromagnetic waves, and the second part shields electromagnetic waves.

(16) A detector including:
a case;
an optically transparent cover to cover the case;
a pair of guides which face each other and are set apart in the case, each having a slope portion sloping so as to be level when the detector inclines and reaches a limit for inclination; and
an indicator held between the slope portions in the pair of guides, including:
    a first part in the shape of rolling on the slope portion of the guide; and
    a second part smaller than the first part and in the shape of not preventing the first part from rolling, wherein the first part and the second part join together and separate when receiving a shock.

(17) The detector according to (16), wherein the pair of guides include pass portions to which the slope portions slopingly connect respectively, and the pass portions are set in the case with each of them separated at a distance of holding the first part but not holding the second part by both of the slope portions for the indicator.

(18) The detector according to any one of (16) to (17), wherein capture portions, which catch the indicator moving away from the guides when the detector inclines beyond the limit for inclination, are set in the case on both outsides of the pair of guides.

(19) The detector according to any one of (16) to (18), wherein the case, the cover, and the first part of the indicator transmit electromagnetic waves, the second part of the indicator shields electromagnetic waves, and a resonant tag, which is detuned by the second part of the indicator held between the slope portions in the pair of guides, is set on backside of the case.

(20) The detector according to any one of (17) to (18), wherein the case, the cover, and the first part of the indicator transmit electromagnetic waves, the second part of the indicator shields electromagnetic waves, and a resonant tag, which is detuned by the second part of the indicator stopped after passing between the pass portions in the pair of guides, is set on backside of the case.

(21) The detector according to (18), wherein the case, the cover, and the first part of the indicator transmit electromagnetic waves, the second part of the indicator shields electromagnetic waves, and a pair of resonant tags, which have different resonant frequencies and are detuned by the second part of the indicator caught in each of the capture portions, are set on backside of the case.

(22) The detector according to (21), wherein both of the pair of resonant tags are detuned by the second part of the indicator held between the slope portions in the pair of guides.

(23) A method for detecting a tumble of and a shock to an article, including:
preparing a detector by using the detector according to (19) and setting the indicator on the pair of guides;
fixing the set detector to an upper position of the article with a longitudinal direction of the detector correspondent to a height direction of the article;
after moving the article, getting the article through a detection gate detecting resonance from the resonant tag;

in a case where the detection gate has detected the resonance, determining that the article has inclined beyond the limit for inclination or received a shock, or both of them have happened to the article; and
in a case where the detection gate has not detected the resonance, determining that the article has not inclined beyond the limit for inclination nor received a shock.

(24) The method according to (23), further including, in a case where the detection gate has detected the resonance, visually observing the first part and the second part of the indicator in the detector through the cover,
in a case where the first part and the second part have moved away from the guides, the first part and the second part being joined together, determining that the article has inclined beyond the limit for inclination,
in a case where the first part is held between the slope portions and separated from the second part, determining that the article has not inclined beyond the limit for inclination but has received a shock, and
in a case where the first part has moved away from the guides and is separated from the second part, determining that the article has inclined beyond the limit for inclination and received a shock.

(25) A method for detecting a tumble of and a shock to an article, including:
preparing a detector by using the detector according to (20) and setting the indicator on the pair of guides;
fixing the set detector to an upper position of the article with a longitudinal direction of the detector correspondent to a height direction of the article;
after moving the article, getting the article through a detection gate detecting resonance from the resonant tag; and
in a case where the detection gate has not detected the resonance, determining that the article has received a shock without inclining beyond the limit for inclination or inclined after receiving a shock even if it has inclined beyond the limit for inclination.

(26) The method according to (25), further including, in a case where the detection gate has not detected the resonance, visually observing the first part and the second part of the indicator in the detector through the cover,
in a case where the first part is held between the slope portions and separated from the second part, determining that the article has not inclined beyond the limit for inclination but has received a shock, and
in a case where the first part has moved away from the guides and is separated from the second part, determining that the article has inclined beyond the limit for inclination, after receiving a shock.

(27) The method according to (25), further including, in a case where the detection gate has detected the resonance, visually observing the first part and the second part of the indicator in the detector through the cover,
in a case where the first part and the second part are joined together and held between the slope portions, determining that the article has not inclined beyond the limit for inclination nor received a shock,
in a case where the first part and the second part have moved away from the guides, the first part and the second part being joined together, determining that the article has inclined beyond the limit for inclination, and
in a case where the first part has moved away from the guides and is separated from the second part, determining that the article has received a shock, after inclining beyond the limit for inclination.

(28) A method for detecting a tumble of and a shock to an article, including:

preparing a detector by using the detector according to (21) and setting the indicator on the pair of guides;

fixing the set detector to an upper position of the article with a longitudinal direction of the detector correspondent to a height direction of the article;

after moving the article, getting the article through two different detection gates detecting resonances from the pair of resonant tags respectively;

in a case where both of the two detection gates have detected the resonances, determining that the article has not received a shock or has received a shock without inclining beyond the limit for inclination, or has inclined after receiving a shock even if it has inclined beyond the limit for inclination; and in a case where one of the two detection gates has not detected the resonance, determining that the article has inclined beyond the limit for inclination in a direction toward the resonant tag not having detected it.

(29) The method according to (28), further including, in a case where both of the two detection gates have detected the resonance, visually observing the first part and the second part of the indicator in the detector through the cover, in a case where the first part and the second part are joined together and held between the slope portions, determining that the article has not inclined beyond the limit for inclination nor received a shock, in a case where the first part is held between the slope portions and separated from the second part, determining that the article has not inclined beyond the limit for inclination but has received a shock, and in a case where the first part has moved away from the guides and is separated from the second part, determining that the article has inclined beyond the limit for inclination, after receiving a shock.

(30) The method according to (28), further including, in a case where one of the two detection gates has not detected the resonance, visually observing the first part and the second part of the indicator in the detector through the cover, in a case where the first part and the second part are joined together, determining that the article has not received a shock, and in a case where the first part and the second part are separated from each other, determining that the article has received a shock.

(31) A method for detecting a tumble of and a shock to an article, including:

preparing a detector by using the detector according to (22) and setting the indicator on the pair of guides;

fixing the set detector to an upper position of the article with a longitudinal direction of the detector correspondent to a height direction of the article;

after moving the article, getting the article through two different detection gates detecting resonances from the pair of resonant tags respectively;

in a case where both of the two detection gates have detected the resonances, determining that the article has received a shock without inclining beyond the limit for inclination, or has inclined after receiving a shock even if it has inclined beyond the limit for inclination; and in a case where one of the two detection gates has not detected the resonance, determining that the article has inclined beyond the limit for inclination in a direction toward the resonant tag not having detected it.

(32) The method according to (31), further including, in a case where both of the two detection gates have detected the resonance, visually observing the first part and the second part of the indicator in the detector through the cover, in a case where the first part is held between the slope portions and separated from the second part, determining that the article has not inclined beyond the limit for inclination but has received a shock, and in a case where the first part has moved away from the guides and is separated from the second part, determining that the article has inclined beyond the limit for inclination, after receiving a shock.

(33) The method according to (31), further including, in a case where one of the two detection gates has not detected the resonance, visually observing the first part and the second part of the indicator in the detector through the cover, in a case where the first part and the second part are joined together, determining that the article has not received a shock, and in a case where the first part and the second part are separated from each other, determining that the article has received a shock.

BRIEF DESCRIPTION OF THE DRAWINGS

FIG. 4 shows a second example of the indicator 100 in Parts (a) to (d).

FIG. 6 shows a fourth example of the indicator 100 in Parts (a) and (b).

FIG. 7 shows a fifth example of the indicator 100 in Parts (a) to (c).

FIG. 9 shows a second example of the detector 200 according to the present invention in Parts (a) to (c).

FIG. 10 shows a third example of the detector 200 according to the present invention in Parts (a) to (c).

FIG. 11 shows a fourth example of the detector 200 according to the present invention in Parts (a) to (c).

FIG. 12 shows a fifth example of the detector 200 according to the present invention in Parts (a) to (d).

FIG. 18 shows the operation of the known detector 10 in Parts (a) and (b).

REFERENCE NUMERALS

Figure 1:
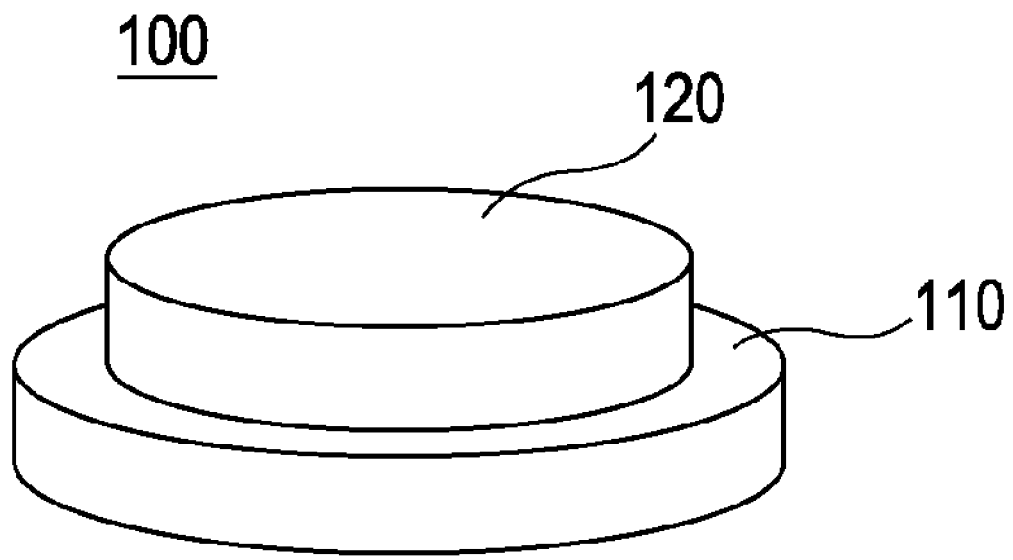
FIG. 1 shows the outline structure of an indicator 100 according to an embodiment of the present invention.
Figure 2:
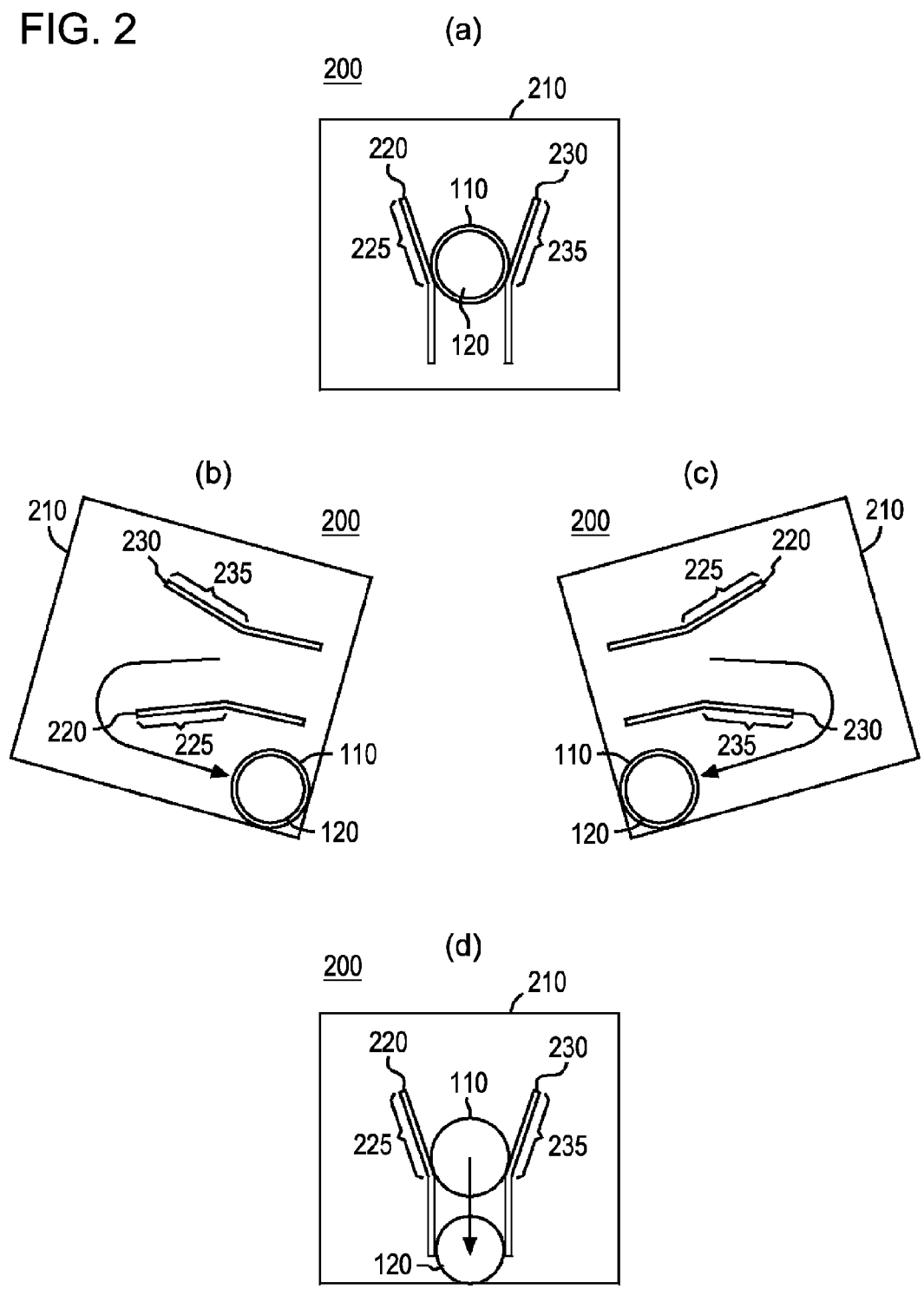
FIG. 2 shows the outline structure of a detector 200, in which the indicator 100 is used, according to an embodiment of the present invention, in Parts (a) to (d).
Figure 3:
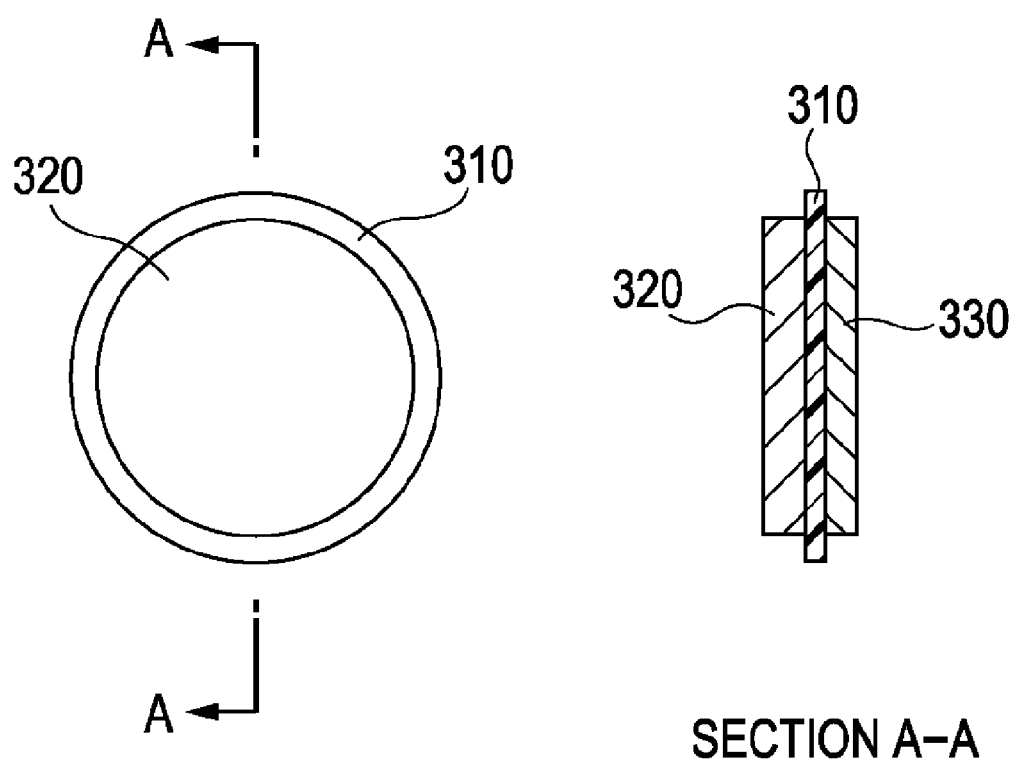
FIG. 3 shows a first example of the indicator 100.
Figure 5:
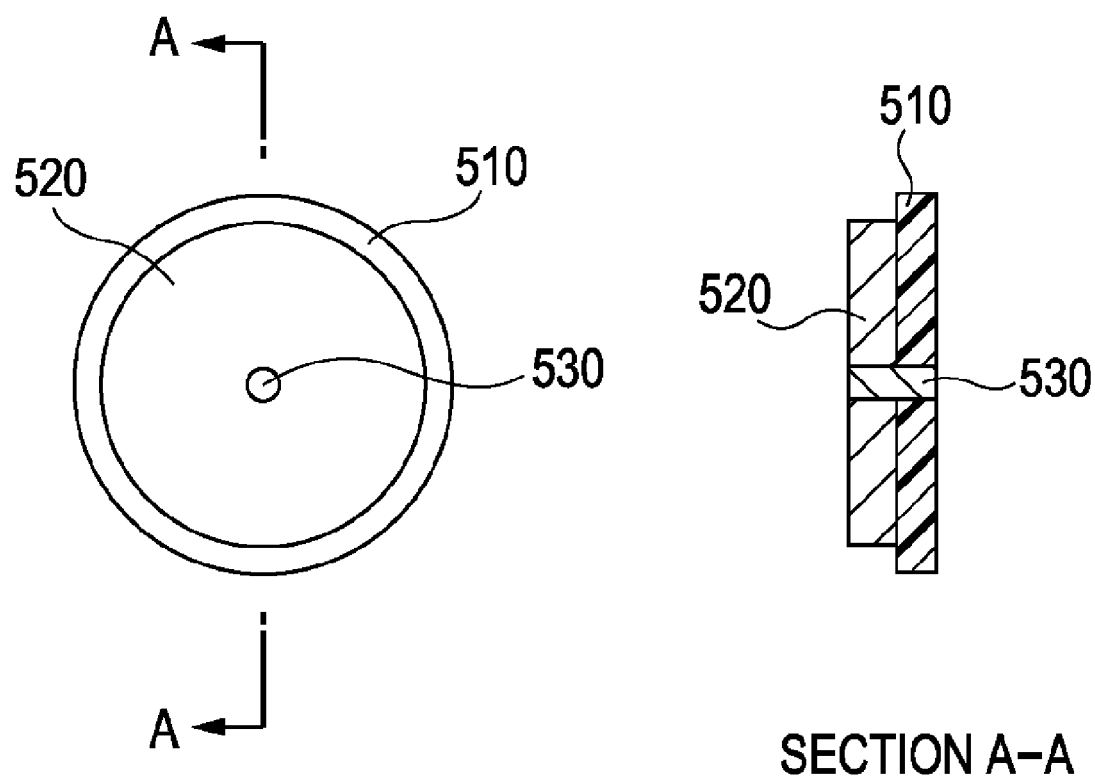
FIG. 5 shows a third example of the indicator 100.
Figure 8:
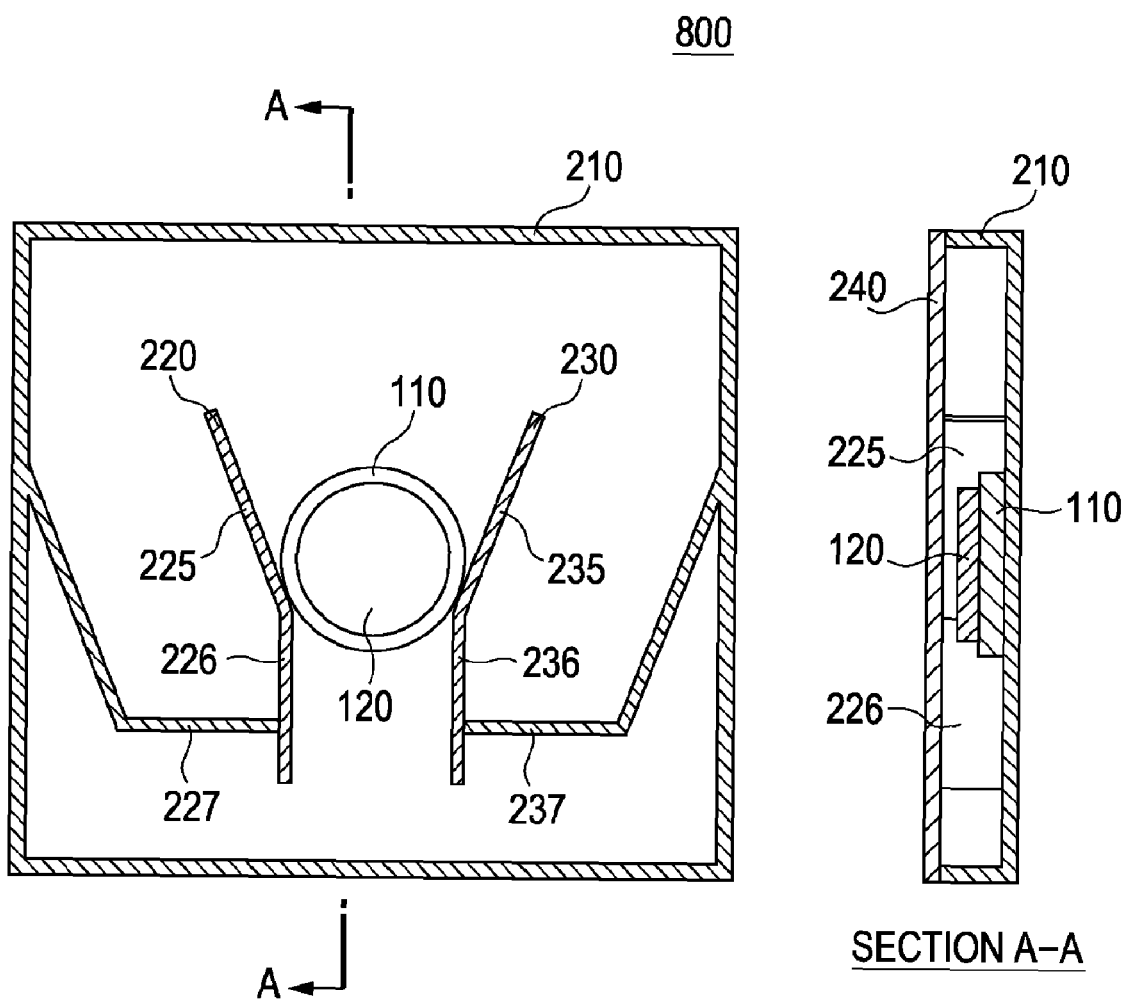
FIG. 8 shows a first example of the detector 200 according to the present invention.
Figure 13:
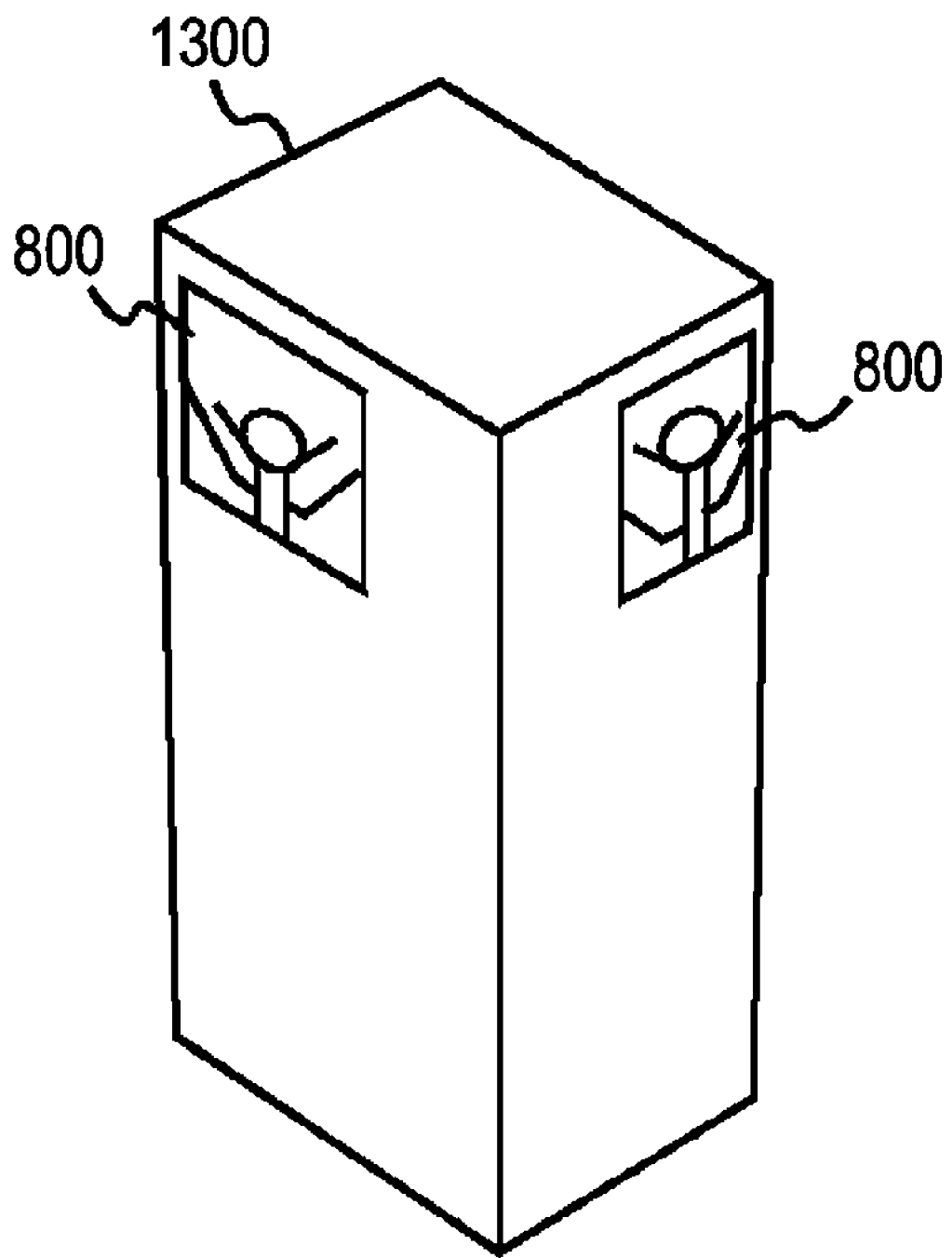
FIG. 13 shows an article to which a detector 800 according to the present invention is attached.
Figure 14:
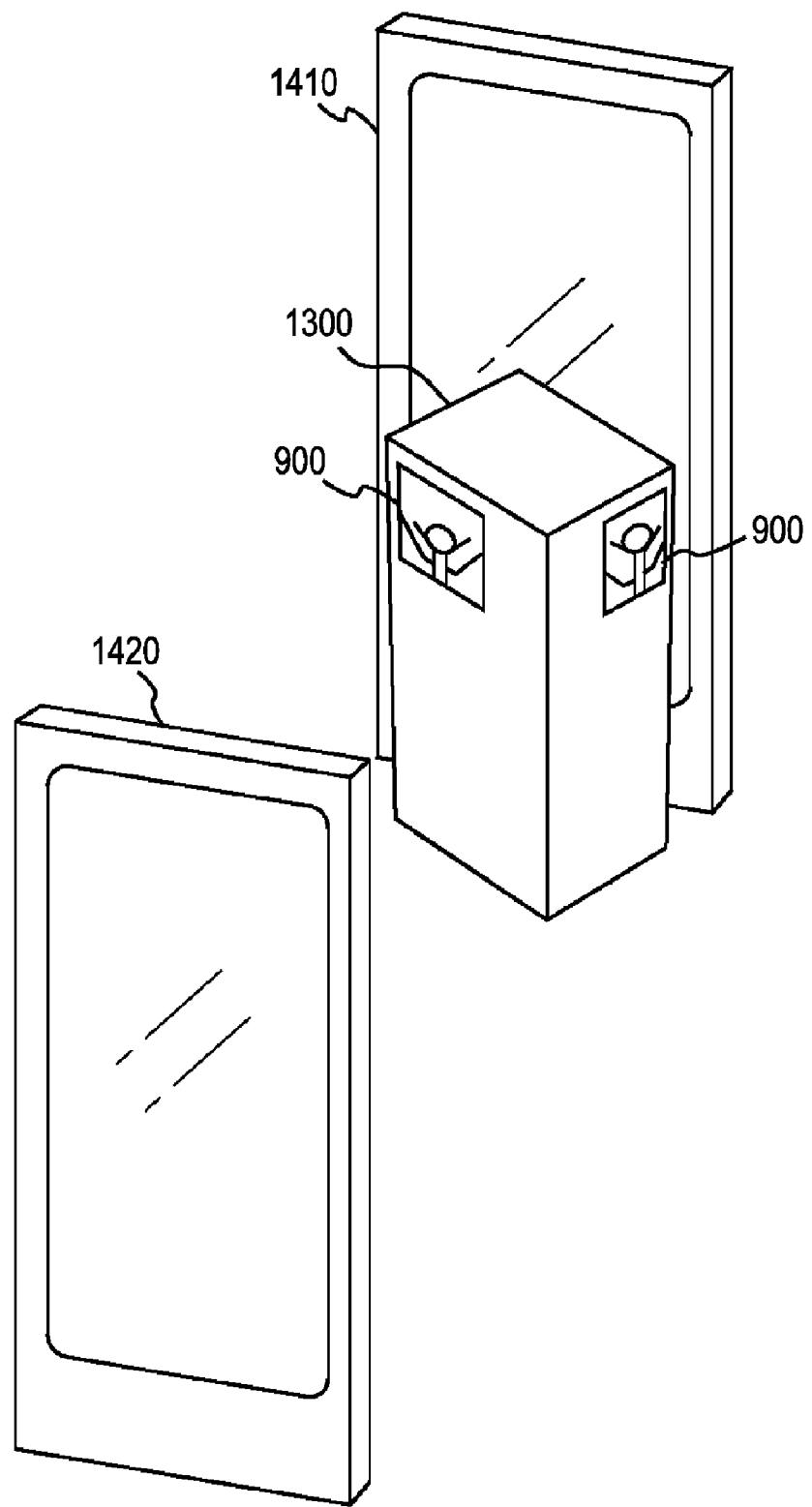
FIG. 14 shows a detection gate 1400 that detects a detector 900 according to the present invention.
Figure 15:
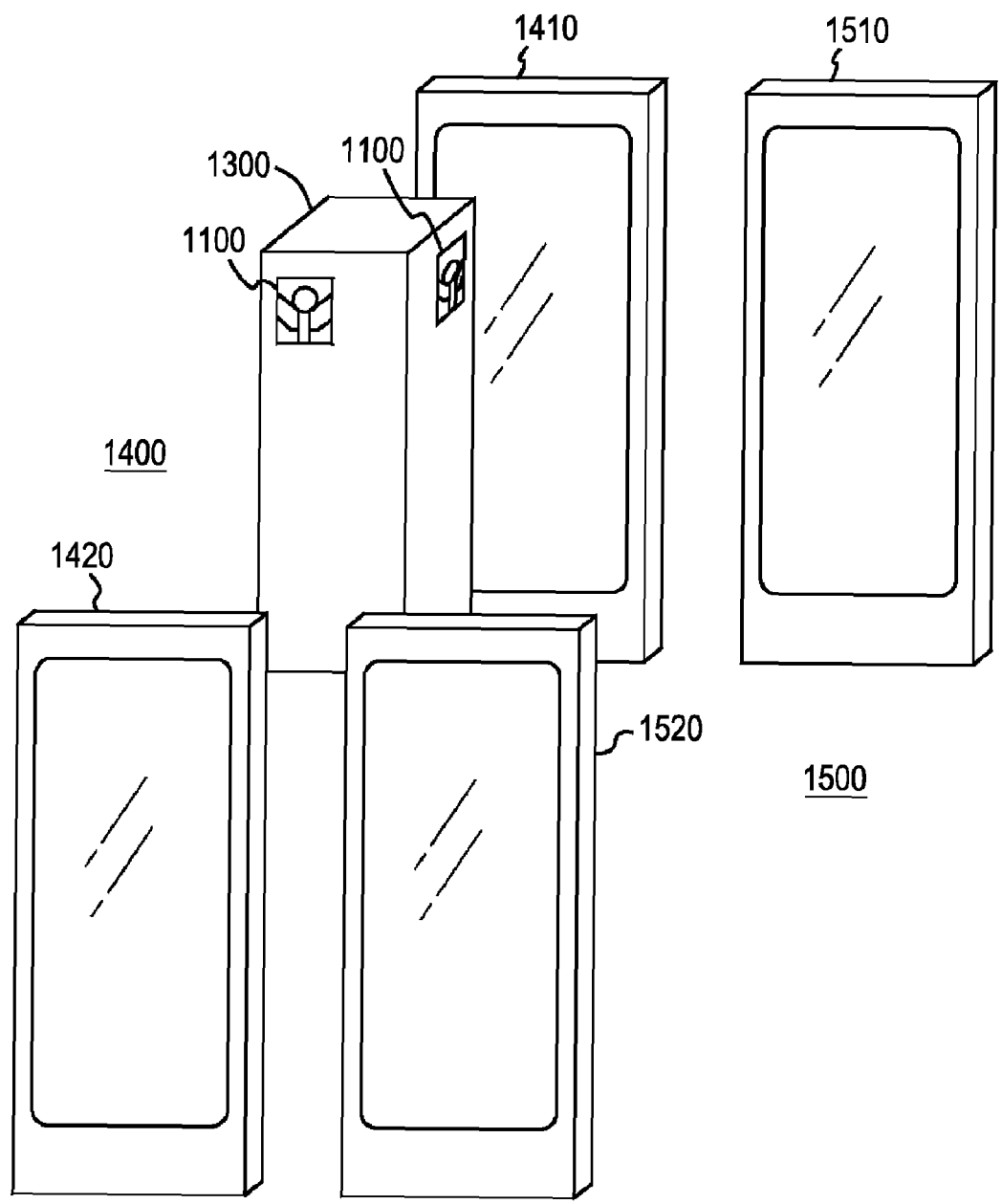
FIG. 15 shows detection gates 1400 and 1500 that detect a detector 1100 according to the present invention.
Figure 16:
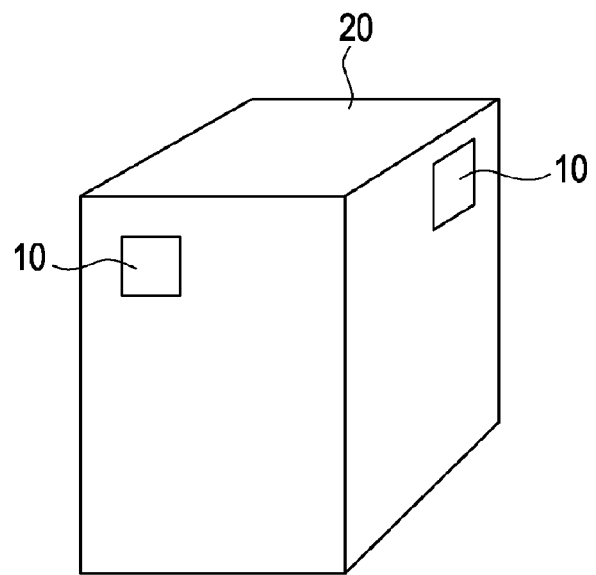
FIG. 16 shows an article to which a known detector 10 is attached.
Figure 17:
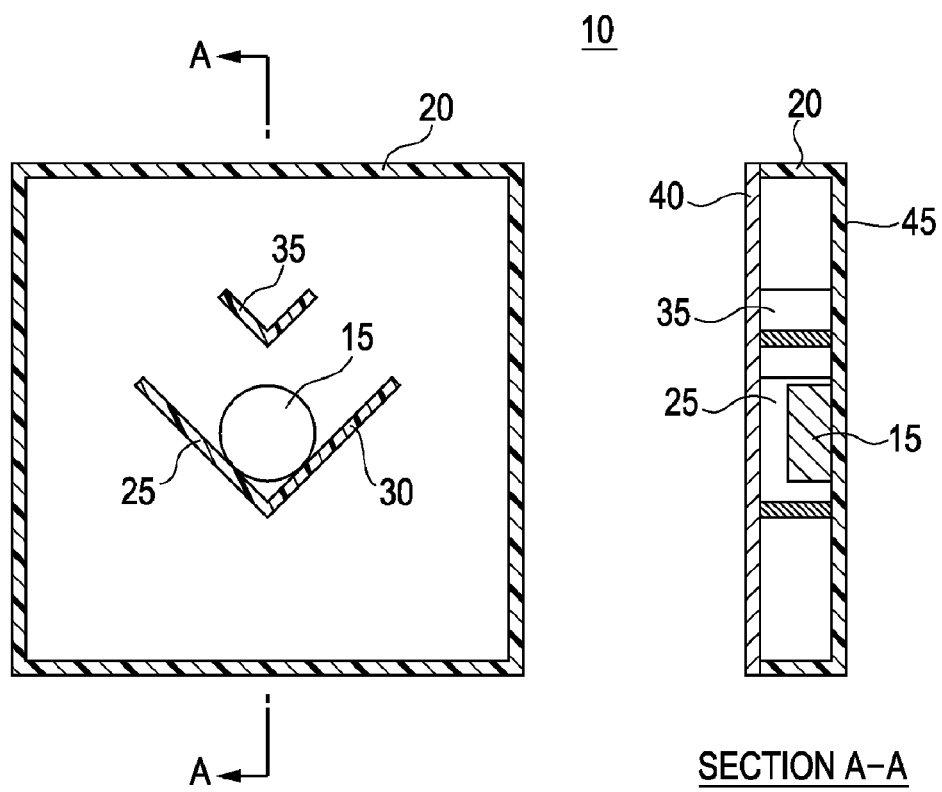
FIG. 17 shows the outline structure of the known detector 10.

100: indicator
110: first part
120: second part
200: detector
220, 230: guide
225, 235: slope portion
226, 236: pass portion
227, 237: capture portion 250, 260, 270, 275, 280, 285: resonant tag
300, 400, 500, 600, 700: indicator
800, 900, 1000, 1100, 1200: detector
1300: article
1400, 1500: detection gate

The invention claimed is:

1. An indicator moving away from a holding guide in a detector when the detector inclines and goes beyond a limit for inclination, comprising:
   a first part to roll on the holding guide when the detector inclines; and
   a second part smaller than the first part and having a shape that does not prevent the first part from rolling,
   wherein the first part and the second part are joined together, and thereafter separate when a shock is received.

2. The indicator of claim 1, wherein the second part includes a first portion and a second portion that join together by a magnetic force, the first part being sandwiched between the first and the second portions, and the first and the second portions separating from one another to release the first part when a shock is received.

3. The indicator of claim 2, wherein at least one of the first and the second portions includes a magnet.

4. The indicator of claim 1, further comprising a joining portion by which the first part and the second part are joined together, wherein the joining portion breaks apart upon a shock being received and separates the first part and the second part from one other.

5. The indicator of claim 4, wherein the joining portion includes a linear member by which the first part and the second part are joined together at or near their respective contact centers.

6. The indicator of claim 4, wherein the joining portion includes a bonding member by which the first part and the second part are joined together at their respective contact surfaces.

7. The indicator of claim 4, wherein the joining portion includes a supporting protrusion that protrudes from a surface of the first part and that supports the second part.

8. The indicator of claim 1, wherein the first part and the second part are each disk-shaped.

9. The indicator according claim 1, wherein the first part transmits electromagnetic waves, and the second part shields electromagnetic waves.

10. A detector comprising:
    a case;
    an optically transparent cover to cover the case;
    a pair of guides that face one other and that are set apart in the case, each guide having a slope portion sloping so as to be level when the detector inclines and reaches a limit of inclination; and
    an indicator held between the slope portions in the pair of guides, comprising:
       a first part to roll on the slope portions of the guides; and
       a second part smaller than the first part and having a shape that does not prevent the first part from rolling,
       wherein the first part and the second part are joined together, and thereafter separate when a shock is received.

11. The detector of claim 10, wherein the pair of guides comprise pass portions to which the slope portions slopingly connect, the pass portions being set in the case such that the pass portions are separated by a distance to hold the first part by both of the slope portions for the indicator and to not hold the second part.

12. The detector of claim 10, further comprising capture portions that catch the indicator moving away from the guides when the detector inclines beyond the limit for inclination, the capture portions set in the case on outsides of the guides.

13. The detector of claim 10, further comprising a resonant tag set on a backside of the case, wherein the case, the cover, and the first part of the indicator transmit electromagnetic waves, the second part of the indicator shields electromagnetic waves, and the resonant tag is detuned by the second part of the indicator held between the slope portions in the pair of guides is.

14. The detector of claim 11, further comprising a resonant tag set on a backside of the case, wherein the case, the cover, and the first part of the indicator transmit electromagnetic waves, the second part of the indicator shields electromagnetic waves, and the resonant tag is detuned by the second part of the indicator when the second part is stopped after passing between the pass portions in the pair of guides.

15. The detector of claim 12, further comprising a pair of resonant tags set on a backside of the case, wherein the case, the cover, and the first part of the indicator transmit electromagnetic waves, the second part of the indicator shields electromagnetic waves, and the resonant tags have different resonant frequencies and are detuned by the second part of the indicator when the second part is caught in each of the capture portions.

16. The detector of claim 15, wherein both of the pair of resonant tags are further detuned by the second part of the indicator held between the slope portions in the pair of guides.

17. A method for detecting a tumble of and a shock to an article, comprising:
    preparing a detector comprising:
       a case;
       an optically transparent cover to cover the case;
       a pair of guides that face one other and that are set apart in the case, each guide having a slope portion sloping so as to be level when the detector inclines and reaches a limit of inclination; and
       an indicator held between the slope portions in the pair of guides, comprising:
          a first part to roll on the slope portions of the guides; and
          a second part smaller than the first part and having a shape that does not prevent the first part from rolling;
       a resonant tag set on a backside of the case,
       wherein the first part and the second part are joined together, and thereafter separate when a shock is received,
       wherein the case, the cover, and the first part of the indicator transmit electromagnetic waves, the second part of the indicator shields electromagnetic waves, and the resonant tag is detuned by the second part of the indicator;
    fixing the detector to an upper position of the article with a longitudinal direction of the detector corresponding to a height direction of the article;
    after moving the article, passing the article through a detection gate detecting resonance from the resonant tag; and
    where the detection gate has detected a resonance, concluding that one or more of the following has occurred: the article has inclined beyond the limit for inclination, and the article has received.

18. The method of claim 17, further comprising, where the detection gate has not detected a resonance, concluding that one or more of the following has occurred: the article has not inclined beyond the limit for inclination, and the article has not received a shock.

19. A method for detecting a tumble of and a shock to an article, comprising:
preparing a detector comprising:
a case;
an optically transparent cover to cover the case;
a pair of guides that face one other and that are set apart in the case, each guide having a slope portion sloping so as to be level when the detector inclines and reaches a limit of inclination; and
an indicator held between the slope portions in the pair of guides, comprising:
a first part to roll on the slope portions of the guides; and
a second part smaller than the first part and having a shape that does not prevent the first part from rolling;
capture portions that catch the indicator moving away from the guides when the detector inclines beyond the limit for inclination, the capture portions set in the case on outsides of the guides;
a pair of resonant tags set on a backside of the case,
wherein the first part and the second part are joined together, and thereafter separate when a shock is received,
wherein the case, the cover, and the first part of the indicator transmit electromagnetic waves, the second part of the indicator shields electromagnetic waves, and the resonant tags have different resonant frequencies and are detuned by the second part of the indicator when the second part is caught in each of the capture portions;
fixing the detector to an upper position of the article with a longitudinal direction of the detector corresponding to a height direction of the article;
after moving the article, passing the article through two different detection gates detecting resonances from the pair of resonant tags respectively;
where both of the two detection gates have detected the resonances, concluding that one of the following has occurred: the article has not received a shock, and the article has received a shock without inclining beyond the limit for inclination.

20. The method of claim 19, further comprising, where one of the two detection gates has not detected the resonance, concluding that the article has inclined beyond the limit for inclination in a direction toward the resonant tag that did not detect the resonance.

* * * * *